United States Patent [19]

Sasamura

[11] Patent Number: 4,647,990

[45] Date of Patent: Mar. 3, 1987

[54] TRACKING CONTROL SYSTEM

[75] Inventor: Kohei Sasamura, Sagamihara, Japan

[73] Assignee: Victor Company of Japan, Ltd., Yokohama, Japan

[21] Appl. No.: 794,123

[22] Filed: Nov. 1, 1985

[30] Foreign Application Priority Data

Nov. 2, 1984 [JP] Japan .................... 59-231975
Dec. 12, 1984 [JP] Japan .................... 59-188374[U]
Dec. 28, 1984 [JP] Japan .................... 59-199207[U]
Jan. 12, 1985 [JP] Japan .................... 60-2689[U]

[51] Int. Cl.$^4$ ............................................ G11B 5/008
[52] U.S. Cl. ........................................ 360/70; 360/77
[58] Field of Search ............................... 360/70, 77

[56] References Cited

U.S. PATENT DOCUMENTS 4,210,943  7/1980  Nakamura et al. ............... 360/77
4,364,097 12/1982  De Boer et al. ................. 360/77
4,402,023  8/1983  Hiraguri ........................... 360/77
4,494,153  1/1985  Ravizza ........................... 360/77
4,549,234 10/1985  Sakamoto ......................... 360/77

Primary Examiner—George G. Stellar
Attorney, Agent, or Firm—Michael N. Meller

[57] ABSTRACT

A tracking control system comprises a capstan motor for moving a magnetic tape which is at least recorded with an FM signal and a control signal having a constant period, a driving circuit for generating a signal which drives the capstan motor, a control head for reproducing the control signal from the tape in a reproducing mode, heads for reproducing the FM signal from the tape in the reproducing mode, a tracking adjuster for generating a comparison signal, a phase comparator for comparing phases of the reproduced control signal with the comparison signal and for generating a phase error signal which is supplied to the driving circuit to control the driving circuit, a sampling circuit for sampling a signal which is based on the reproduced FM signal with a preset sampling interval, a discriminating circuit for discriminating levels of sampled data obtained from the sampling circuit, and a circuit for generating a control signal based on a discriminated result in the discriminating circuit and for supplying the control signal to the tracking adjuster to automatically and variably control a duty cycle of the comparison signal so that an envelope level of the reproduced FM signal becomes a maximum.

19 Claims, 33 Drawing Figures

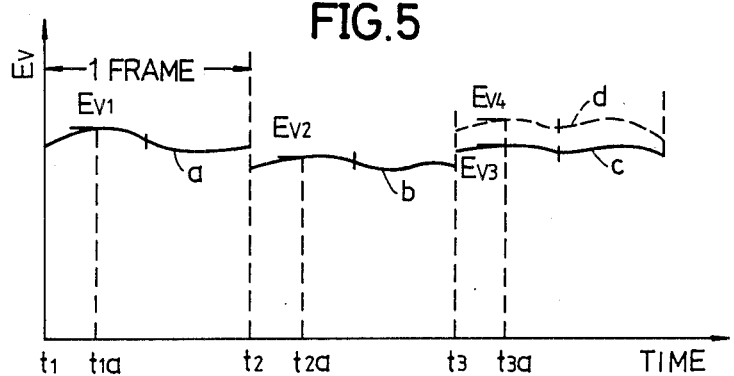
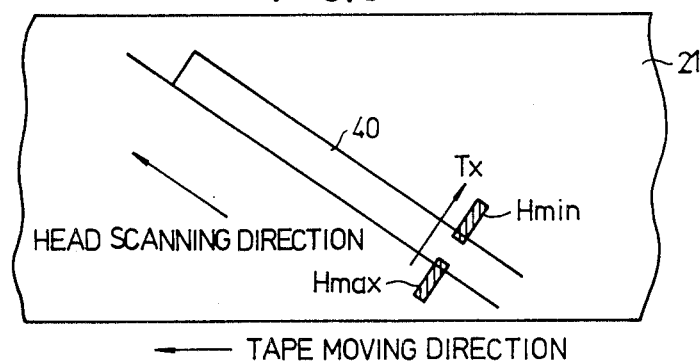
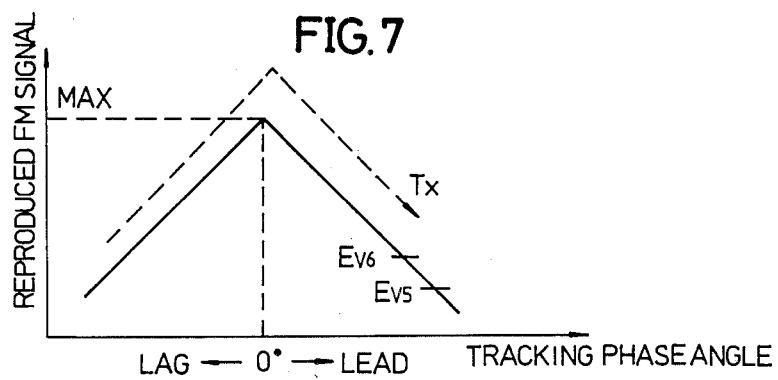

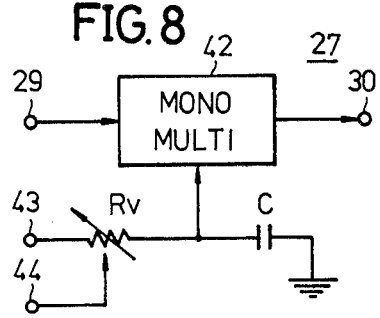
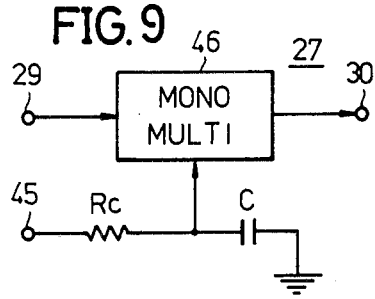
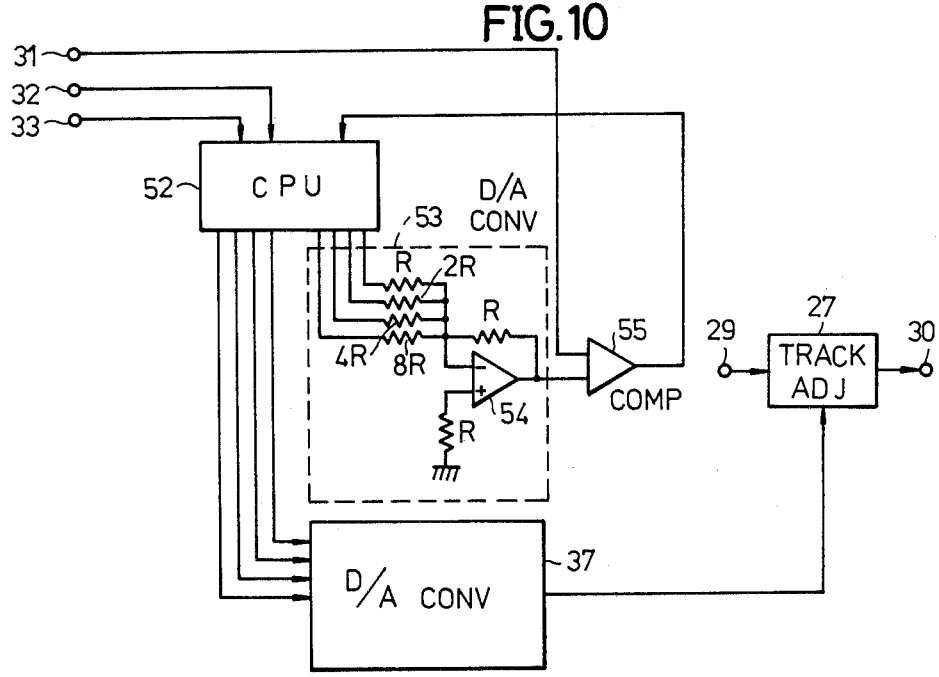
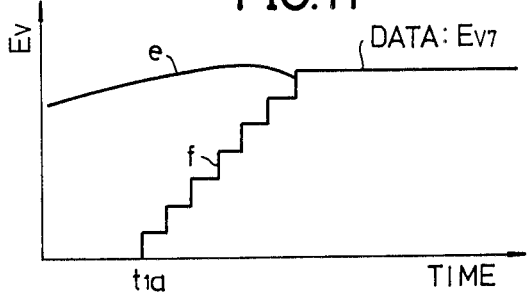

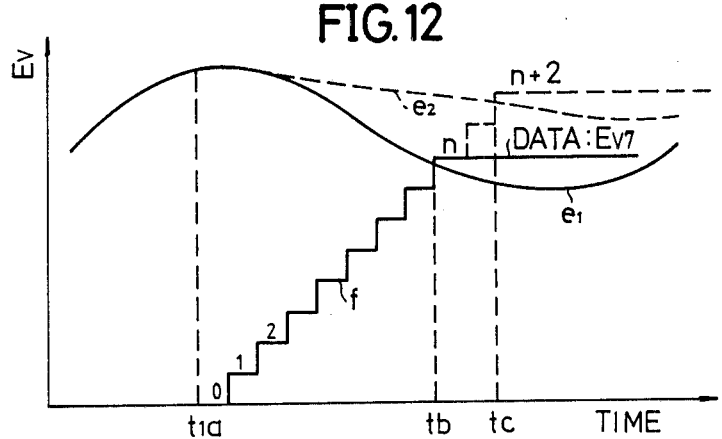
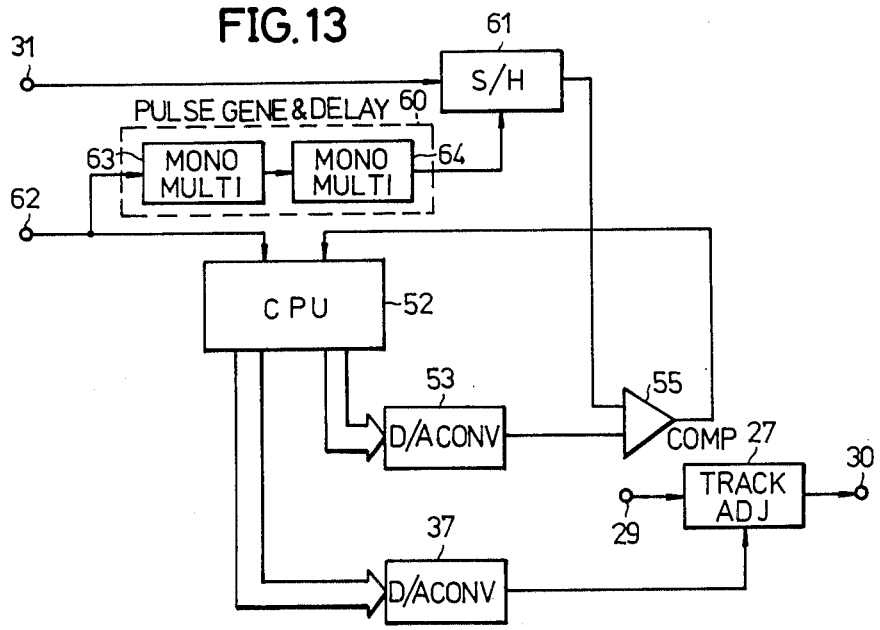

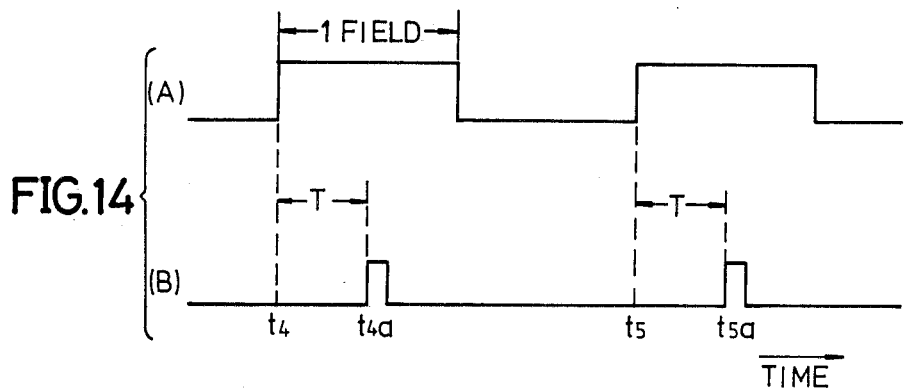
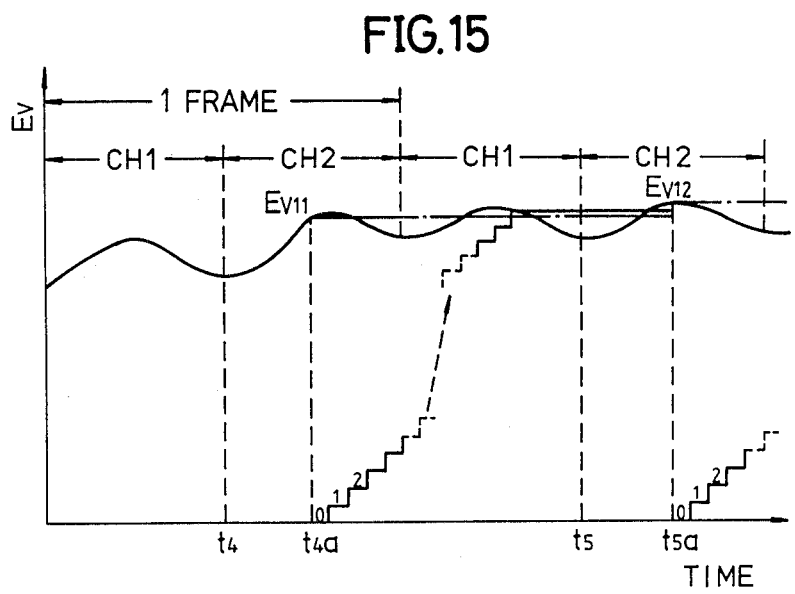

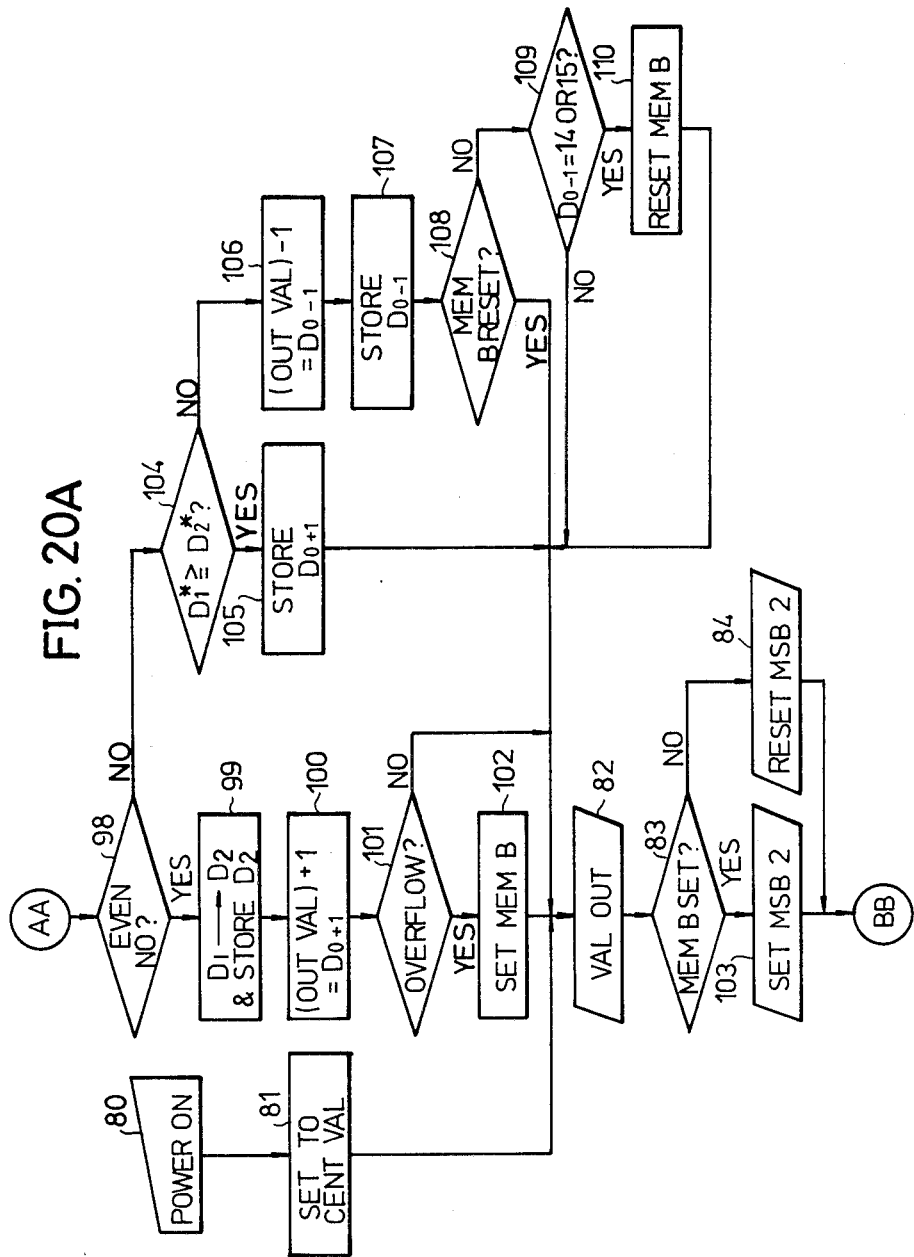

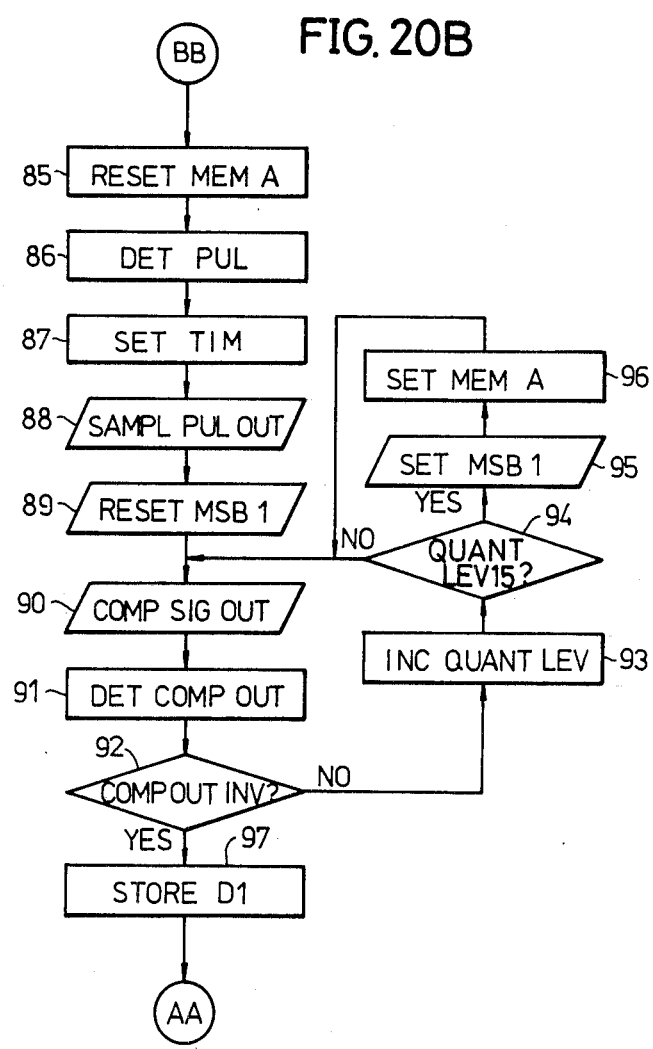

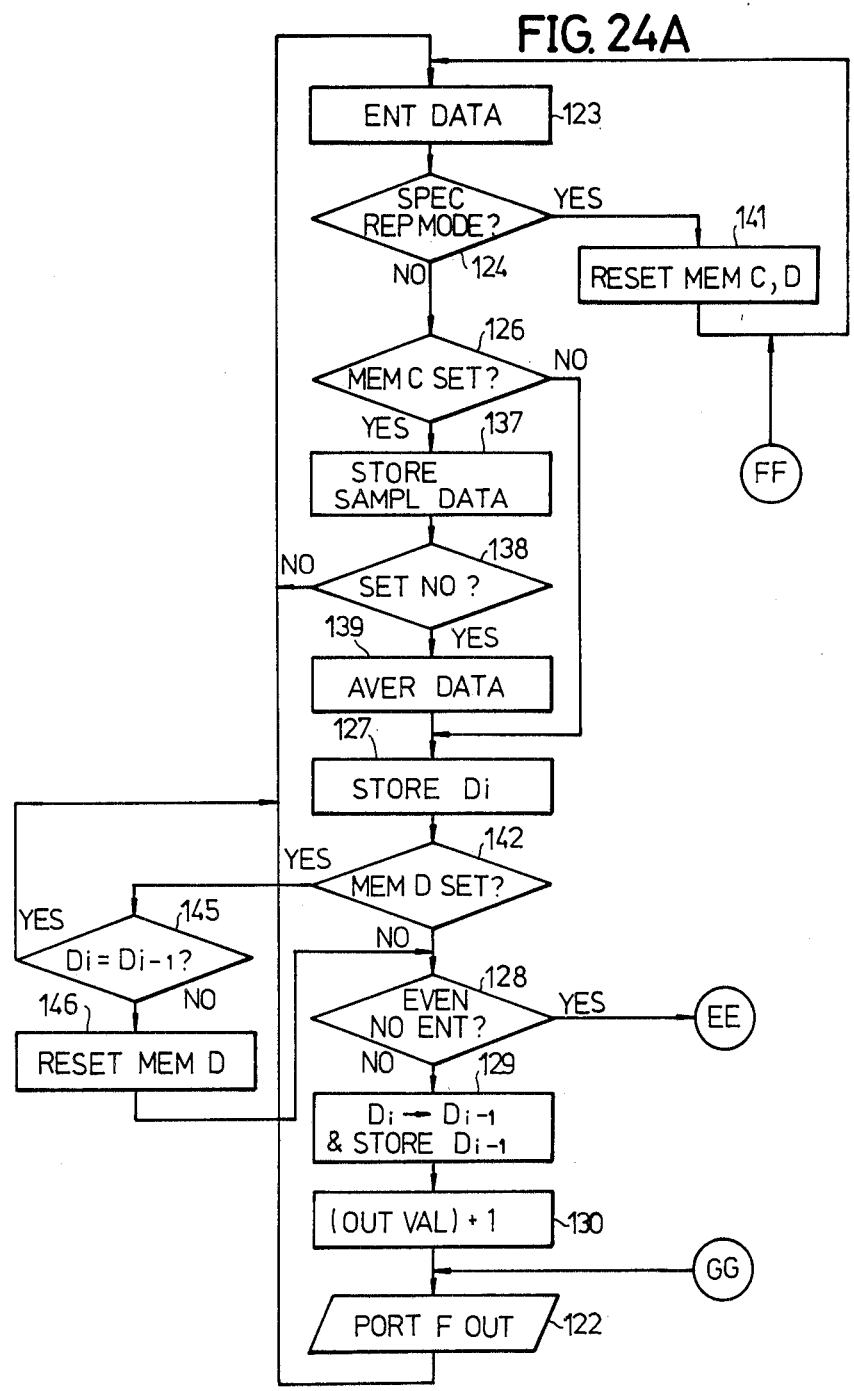

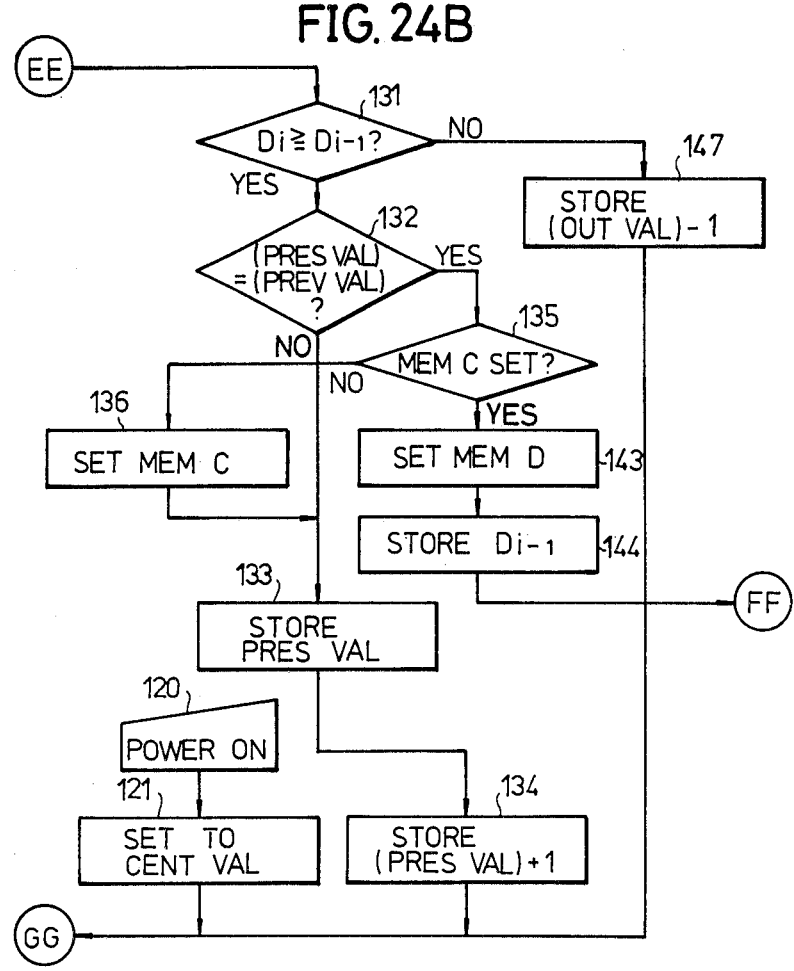

TRACKING CONTROL SYSTEM

BACKGROUND OF THE INVENTION

The present invention generally relates to tracking control systems, and more particularly to a tracking control system which carries out a tracking control in a reproducing mode of a helical scan type magnetic tape recording and reproducing apparatus by controlling a moving speed of a magnetic tape so that a magnetic head accurately scans over a recorded track on the magnetic tape.

Generally, when playing on one video tape recorder (hereinafter simply referred to as a VTR) a magnetic tape which has been recorded on another VTR to carry out a so-called interchanged play, a scanning locus of a magnetic head of the one VTR may not coincide with a recorded track on the magnetic tape. In addition, in the case of a magnetic tape which has been recorded in a long-time recording mode wherein the recording is carried out with a tape moving speed slower than that of a normal recording mode, recorded tracks have a width considerably narrower than that of recorded tracks on a magnetic tape which has been recorded in the normal recording mode. For these reasons, it is necessary to carry out a tracking control operation so that the magnetic head accurately scans over the recorded track on the magnetic tape.

Various tracking control systems have been proposed for the helical scan type VTR. In one example of the conventional tracking control system, a pair of magnetic heads are mounted on respective support members using bimorph, and the magnetic heads are displaced substantially in the track width direction so that the magnetic heads accurately scan over the recorded tracks on the magnetic tape. In another example of the conventional tracking control system, a pair of magnetic heads are mounted on a single support member, and the single support member undergoes a see-saw movement to displace the magnetic heads substantially in the track width direction so that the magnetic heads accurately scan over the recorded tracks on the magnetic tape. However, according to these conventional tracking control systems, the construction of a head assembly becomes complex, and the manufacturing cost of the head assembly accordingly becomes high. In addition, it is necessary to provide a circuit part for generating a control signal which is used to displace the magnetic heads. Hence, when considering the high cost of these conventional tracking control systems, these systems are not suited for a VTR for home.

On the other hand, an inexpensive tracking control system suited for the VTR for home use has also been proposed. According to this system, the tracking control is carried out by controlling a capstan motor which drives a capstan for moving the magnetic tape, as will be described later on in the specification in conjunction with the drawings. However, this system requires a manual adjustment to be performed by the user. In other words, in a reproducing mode of the VTR, the user makes a manual adjustment while monitoring a reproduced picture so that an optimum picture quality is obtained. As a result, this system is disadvantageous in that it is troublesome to perform the manual adjustment and that it takes time to complete the manual adjustment.

SUMMARY OF THE INVENTION

Accordingly, it is a general object of the present invention to provide a novel and useful tracking control system in which the disadvantages described heretofore are overcome.

Another and more specific object of the present invention is to provide a tracking control system which samples with a preset sampling interval a signal which is based on a frequency modulated signal which is reproduced from a magnetic tape and variably controls a tracking adjuster based on the sampled data. According to the tracking control system of the present invention, it is possible to control the movement of the magnetic tape so that the magnetic head accurately scans over the recorded track on the magnetic tape within an extremely short period of time from a start of a reproducing mode, and the tracking controlled state can be maintained thereafter. The tracking control is carried out automatically, and there is no need to perform a manual adjustment. It is thus possible to always obtain an extremely stable reproduced picture of a high picture quality even in the case of an interchanged play and a long-time reproducing mode and even when a change such as a change in the ambient temperature occurs.

Still another object of the present invention is to provide a tracking control system which employs a n-bit central processing unit (CPU) but carries out a tracking control which is equivalent to a tracking control carried out when a (n+i)-bit CPU is employed by improving the software. According to the tracking control system of the present invention, it is possible to use an inexpensive CPU such as a 4-bit CPU and still carry out a tracking control equivalent to a tracking control which is carried out when a more expensive CPU having more than 4 bits is employed. It is necessary to use a (n+i)-bit digital-to-analog (D/A) converter, however, the cost of the (n+i)-bit D/A converter is essentially the same as that of an n-bit D/A converter. As a result, it is possible to carry out a tracking control with a high accuracy and with a reduced wow and flutter by use of an inexpensive circuit.

A further object of the present invention is to provide a tracking control system which successively carries out a tracking control based on each sampled data in an initial state of the tracking control operation and carries out a tracking control based on averaged values of the sampled data after an approximate steady state of the tracking control operation is reached. According to the tracking control system of the present invention, the approximate steady state of the tracking control operation is reached within a short time period from a start of the tracking control operation. It is possible to carry out a tracking control operation with a timing which takes into account a delay in the response of a capstan motor or the like by comparing the averaged values of the sampled data after the approximate steady state of the tracking control operation is reached. It is also possible to eliminate undesirable effects of a level fluctuation in an envelope detection signal of a frequency modulated signal which is reproduced from a magnetic tape since the average values of the sampled data are compared. In addition, the frequency of a wow and flutter which is introduced when a calibration is performed can be reduced because the calibration is performed within a minimum required range. As a result, a stable reproduced picture of a high picture quality can be obtained.

Other objects and further features of the present invention will be apparent from the following detailed description when read in conjunction with the accompanying drawings.

BRIEF DESCRIPTION OF THE DRAWINGS

FIG. 5 shows an envelope detection signal for explaining the operation of the block system shown in FIG. 4;

FIG. 6 is a diagram for explaining scanning positions of a magnetic head;

FIG. 7 shows the relationship between a tracking phase angle and a reproduced frequency modulated signal;

FIG. 8 shows an embodiment of a tracking adjuster;

FIG. 9 shows another embodiment of the tracking adjuster;

FIG. 10 is a system block diagram showing an essential part of a second embodiment of the tracking control system according to the present invention;

FIGS. 11 and 12 respectively show the envelope detection signal for explaining the sampling operation of the block system shown in FIG. 10;

FIG. 13 is a system block diagram showing an essential part of a third embodiment of the tracking control system according to the present invention;

FIGS. 14(A) and 14(B) respectively show signal waveforms for explaining the operation of the block system shown in FIG. 13;

FIG. 15 shows the envelope detection signal for explaining the sampling operation of the block system shown in FIG. 13;

FIGS. 20A and 20B respectively are flow charts for explaining the operation of a CPU in the block system shown in FIG. 18;

FIGS. 24A and 24B respectively are flow charts for explaining another embodiment of the operation of the CPU in the block system shown in FIG. 21.

DETAILED DESCRIPTION

Figure 1:
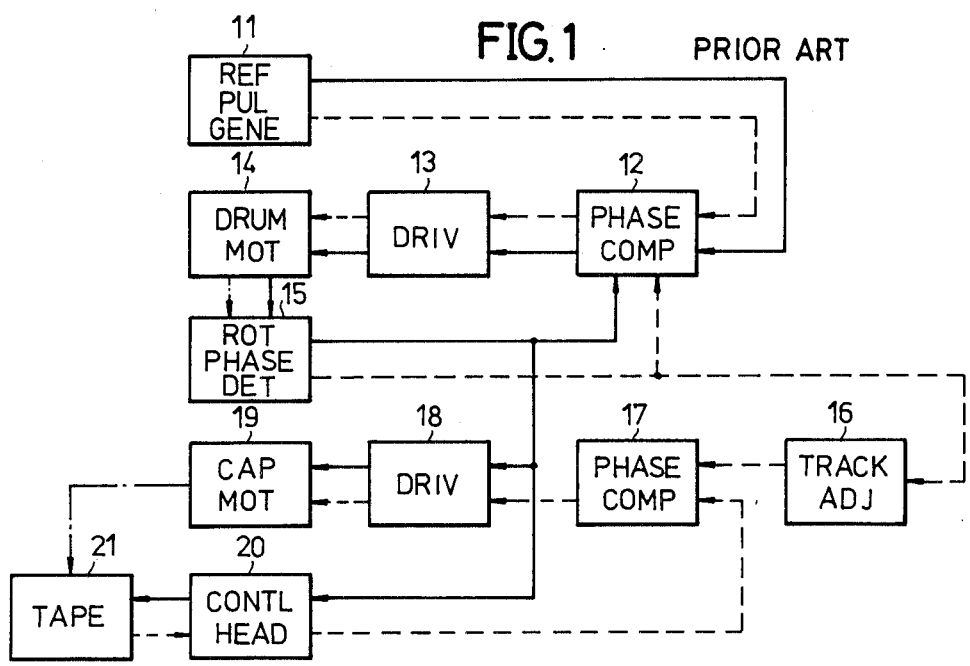
FIG. 1 is a system block diagram showing an example of a conventional tracking control system.

First, description will be given with respect to an example of the conventional tracking control system by referring to FIG. 1. In FIG. 1, a solid line connecting the blocks indicates the signal flow in a recording mode, and a phantom line connecting the blocks indicates the signal flow in a reproducing mode. In the recording mode, a reference pulse signal from a reference pulse generator 11 is supplied to a phase comparator 12. The rotational phase of a drum motor 14 for driving a drum (not shown) which is mounted with rotary magnetic heads (not shown) is detected by a rotational phase detector 15. The phase comparator 12 compares the phase of the reference pulse signal with an output rotation detection pulse signal of the rotational phase detector 15 and supplies a phase error signal to a motor driving circuit 13. The motor driving circuit 13 drives the drum motor 14 responsive to the phase error signal and controls the rotation of the drum motor 14. Thus, in the recording mode, the drum servo circuit controls the drum motor 14 so that a vertical synchronizing signal is recorded by the rotary magnetic heads at predetermined positions on a magnetic tape 21.

On the other hand, the output rotation detection pulse signal of the rotational phase detector 15 is passed through a motor driving circuit 18 and is supplied to a capstan motor 19 so as to control the rotational speed of the capstan motor 19 to a constant speed. A capstan (not shown) and a pinch roller (not shown) are rotated by the capstan motor 19, and the magnetic tape 21 is moved at a constant tape moving speed in a state pinched between the capstan and the pinch roller. The rotation detection pulse signal from the rotational phase detector 15 is supplied to a control head 20 which records the rotation detection pulse signal on a control track of the magnetic tape 21 as a control pulse signal. The control track exists along the longitudinal direction of the magnetic tape 21, and the control pulse signal is recorded on the control track while maintaining a predetermined relationship with tracks which are formed obliquely to the longitudinal direction of the magnetic tape 21 by the rotary magnetic heads. Hence, in the recording mode, the capstan servo circuit controls the capstan motor 19 so that the magnetic tape 21 is moved at the constant tape moving speed.

Figure 2:
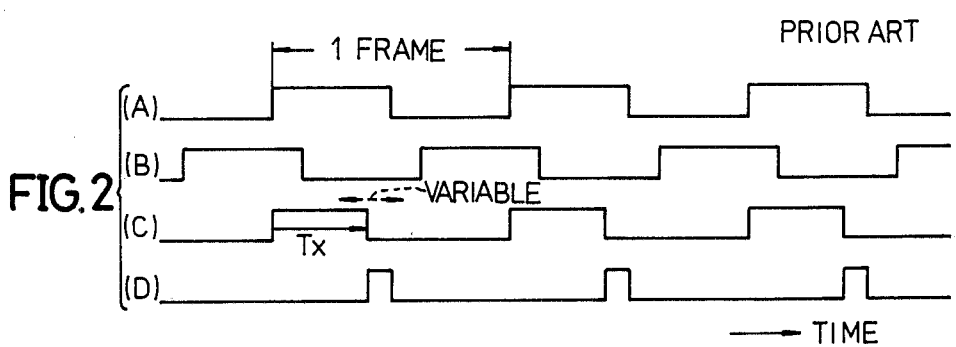
FIGS. 2(A) through 2(D) show signal waveforms for explaining the operation of the block system shown in FIG. 1.

Next, in the reproducing mode, the phase comparator 12 compares the phase of the output rotation detection pulse signal of the rotational phase detector 15 shown in FIG. 2(A) with the phase of the output reference pulse signal of the reference pulse generator 11 shown in FIG. 2(B), and supplies the phase error signal to the motor driving circuit 13. Hence, in the reproducing mode, the drum servo circuit controls the drum motor 14 so that the rotary magnetic heads accurately scan over recorded tracks on the magnetic tape 21.

On the other hand, in the reproducing mode, the duty cycle of the rotation detection pulse signal from the rotational phase detector 15 shown in FIG. 2(C) is manually adjusted in the capstan servo circuit by a tracking adjuster 16.

The tracking adjuster 16 is generally constituted by a monostable multivibrator, and the time constant of the monostable multivibrator is variably controlled by manually turning a knob which is sometimes referred to as a tracking volume. The tracking adjuster 16 is triggered by a rising edge of the rotation detection pulse signal shown in FIG. 2(A) and generates a pulse signal having a pulse width Tx which is dependent on the time constant of the monostable multivibrator. The pulse signal generated from the tracking adjuster 16 has a period identical to the period of the rotation detection pulse signal.

The output pulse signal of the tracking adjuster 16 is supplied to a phase comparator 17 as a comparison signal and is subjected to a phase comparison with the control pulse signal shown in FIG. 2(D) which is reproduced by the control head 20. An output phase error signal of the phase comparator 17 is passed through the motor driving circuit 18 and is supplied to the capstan motor 19 so as to control the rotational speed of the capstan motor 19. Accordingly, the movement of the magnetic tape 21 is controlled so that the timing with which the control pulse signal is reproduced with respect to the rotational phase of the rotary magnetic heads is in accordance with the setting made in the tracking adjuster 16, and the rotary heads accurately scan over the recorded tracks on the magnetic tape 21.

Generally, when playing on one video tape recorder (VTR) a magnetic tape which has been recorded on another VTR to carry out the so-called interchanged play, a scanning locus of a rotary magnetic head of the one VTR may not coincide with a recorded track on the magnetic tape. In addition, in the case of a magnetic tape which has been recorded in a long-time recording mode wherein the recording is carried out with a tape moving speed slower than that of a normal recording mode, recorded tracks have a width considerably narrower than that of recorded tracks on a magnetic tape which has been recorded in the normal recording mode. For these reasons, it is necessary to carry out a tracking control operation so that the rotary magnetic head accurately scans over the recorded track on the magnetic tape. On the other hand, when changes such as a change in the ambient temperature occurs in the recording mode, parts used in the drum system undergo expansion and contraction but the control head is virtually unaffected by such a temperature change. As a result, the relationship between the recorded tracks on the magnetic tape and the timing with which the control pulse signal is reproduced from the magnetic tape is not necessarily the same at the beginning of the magnetic tape where the recording was started and at the end of the magnetic tape where the recording was ended. Such a difference in the relationship between the recorded tracks on the magnetic tape and the timing with which the control pulse signal is reproduced from the magnetic tape introduces a tracking error (that is, the scanning locus of the rotary magnetic head does not accurately coincide with the recorded track on the magnetic tape), and the signal-to-noise ratio of the reproduced signal becomes poor when the tracking error occurs.

In the conventional tracking control system shown in FIG. 1, the user manipulates the tracking volume while monitoring the reproduced picture when varying the time constant of the tracking adjuster 16. The time constant of the tracking adjuster 16 is varied manually so that the rotary magnetic head accurately scans over the recorded track on the magnetic tape and a reproduced picture of an optimum picture quality is obtained. In other words, the conventional tracking control system carries out a manual tracking control. Hence, this conventional tracking control system is disadvantageous in that it is troublesome to carry out the manual adjustment of the tracking adjuster and it takes time to complete the adjustment.

The present invention eliminates these disadvantages of the conventional tracking control system by sampling with a preset sampling interval a signal which is based on a frequency modulated signal reproduced from the magnetic tape and variably controlling automatically the tracking adjuster based on the sampled data.

Figure 3:
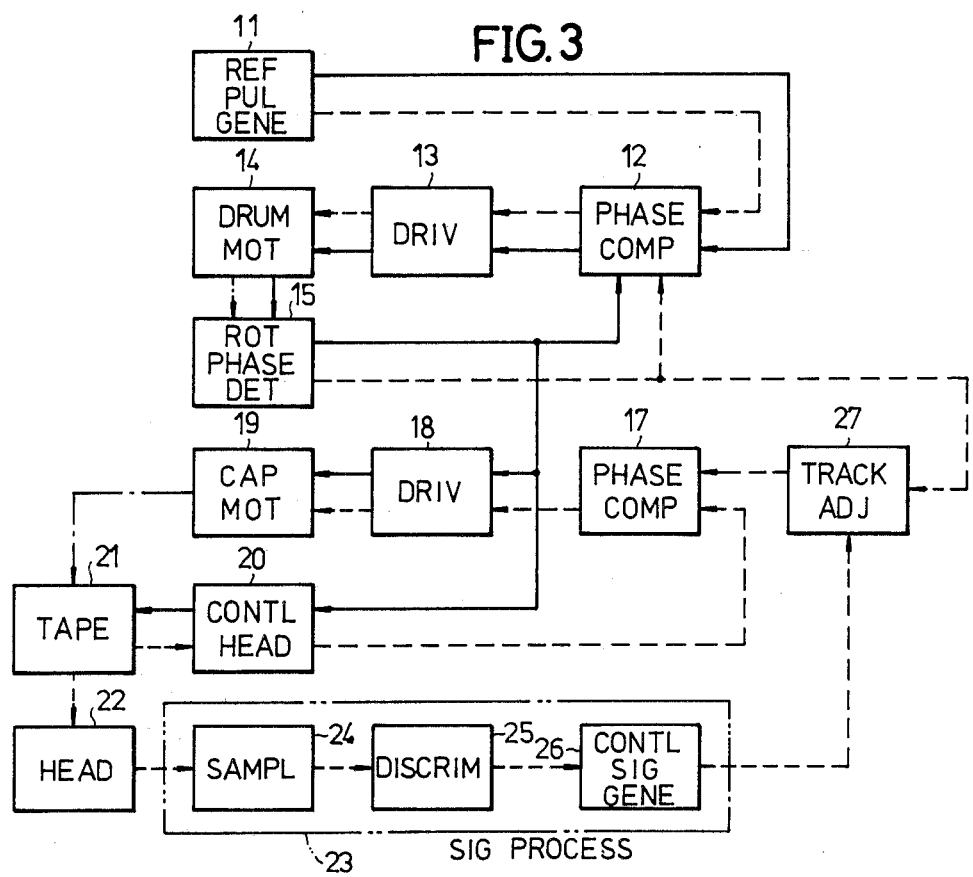
FIG. 3 is a system block diagram showing the tracking control system according to the present invention.

FIG. 3 shows the block system of the tracking control system according to the present invention. In FIG. 3, those parts which are the same as those corresponding parts in FIG. 1 are designated by the same reference numerals, and description thereof will be omitted. An information signal (frequency modulated signal) which is reproduced from the magnetic tape 21 by rotary magnetic head means 22 is supplied to a signal processing part 23 which constitutes an essential part of the tracking control system according to the present invention. The signal processing part 23 comprises a sampling circuit 24, a discriminating circuit 25, and a control signal generating circuit 26. The sampling circuit 24 samples with a preset sampling interval a signal which is based on the reproduced frequency modulated signal. For example, the sampling circuit 24 detects the envelope of the reproduced frequency modulated signal so as to obtain an envelope detection signal, and samples the envelope detection signal with the preset sampling interval. The sampled data from the sampling circuit 24 is supplied to the discriminating circuit 25 which compares the sampled data or compares average values of the sampled data. The discriminating circuit 25 discriminates from this comparison the quantity and direction of the tracking error. A signal indicating the discriminated result in the discriminating circuit 25 is supplied to the control signal generating circuit 26. The control signal generating circuit 26 generates based on the output signal of the discriminating circuit 25 a control signal for variably controlling a tracking adjuster 27 so that the envelope detection signal of the reproduced frequency modulated signal assumes a maximum level. This output control signal of the control signal generating circuit 26 is supplied to the tracking adjuster 27. Thus, the tracking adjuster 27 is controlled responsive to the control signal so as to vary the duty cycle of an output pulse signal of the tracking adjuster 27, and the tape moving speed is variably controlled so that the control pulse signal is reproduced from the magnetic tape 21 by the control head 20 with an optimum timing with respect to the recorded tracks on the magnetic tape 21. Therefore, the scanning loci of the rotary magnetic head means 22 accurately coincide with the recorded tracks on the magnetic tape 21.

Figure 4:
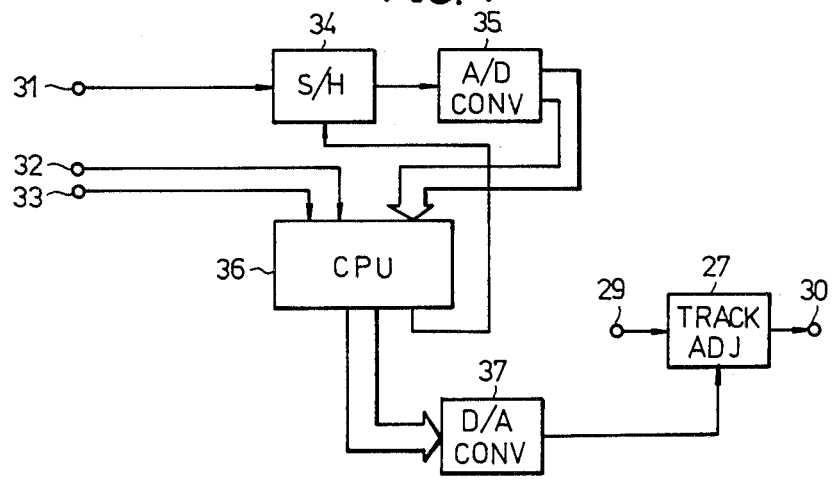
FIG. 4 is a system block diagram showing an essential part of a first embodiment of the tracking control system according to the present invention.

FIG. 4 is a system block diagram showing an essential part of the first embodiment of the tracking control system according to the present invention. In FIG. 4, those parts which are the same as those corresponding parts in FIG. 3 will be designated by the same reference numerals. The envelope detection signal of the frequency modulated (FM) signal which is reproduced from the magnetic tape by the rotary magnetic head means is applied to an input terminal 31 and is supplied to a sample and hold (S/H) circuit 34. The rotation detection pulse signal shown in FIG. 2(A) which is obtained in the rotational phase detector 15 shown in FIG. 3 by detecting the rotational phase of the drum motor 14 and has a period of one frame of the video signal is applied to an input terminal 32. The rotation detection pulse signal from the input terminal 32 is supplied to a central processing unit (CPU) 36. A mode discrimination signal which indicates whether the VTR is in a normal reproducing mode or a special reproducing mode is applied to an input terminal 33 and is supplied to the CPU 36. The mode discrimination signal is generated from a mode selection part (not shown) of the VTR responsive to a manipulation of a mode selecting button (not shown) by the user.

In the special reproducing mode, the CPU 36 generates a control signal for setting the time constant of the tracking adjuster 27 to a center value in a variable range of the time constant. On the other hand, in the normal reproducing mode, the CPU 36 generates based on the rotation detection pulse signal from the input terminal 32 a sampling pulse signal having a constant pulse width and a period of one frame, for example. The sampling pulse signal is supplied to the S/H circuit 34 so as to sample and hold the envelope detection signal from the input terminal 31. Hence, the S/H circuit 34 and a part of the CPU 36 which generates the sampling pulse signal constitute the sampling circuit 24 shown in FIG. 3.

The envelope detection signal supplied to the S/H circuit 34 is shown in FIG. 5 by curves a, b, and c (or d). Times t1, t2, and t3 indicate the times when the leading edges of the rotation detection pulse signal from the input terminal 32 are obtained. Times t1a, t2a, and t3a indicate the times when the sampling is performed in the S/H circuit 34 responsive to the sampling pulse signal. From the time t1a to the time t2a, the S/H circuit 34 generates a sample data (voltage) Ev1 which is sampled at the time t1a. Similarly, the S/H circuit 34 generates from the time t2a to the time t3a a sampled data Ev2 which is sampled at the time t2a, and generates from the time t3a to the next sampling time one frame thereafter a sampled data Ev3 (or Ev4 as will be described later) which is sampled at the time t3a. The sampled data generated from the S/H circuit 34 is supplied to an analog-to-digital (A/D) converter 35 and is converted into a digital signal (sampled data) having a predetermined number of bits. The output sampled data of the A/D converter 35 is supplied to the CPU 36.

The CPU 36 compares the present sampled data from the A/D converter 35 with the previous sampled data from the A/D converter 34, and generates a digital control signal dependent on which of the two sampled data has the larger value. The digital control signal from the CPU 36 is converted into an analog control signal in a digital-to-analog (D/A) converter 37 and is supplied to the tracking adjuster 27 as a control signal for varying the time constant of the tracking adjuster 27. In other words, the A/D converter 35 and a part of the CPU 36 constitute the discriminating circuit 25 shown in FIG. 3, and the D/A converter 37 and a part of the CPU 36 which generates the digital control signal constitute the control signal generating circuit 26 shown in FIG. 3.

The output rotation detection pulse signal of the rotational phase detector 15 is applied to a terminal 29, and the output pulse signal of the tracking adjuster 27 is supplied to the phase comparator 17 through a terminal 30.

In the case where the time constant of the tracking adjuster 27 is a maximum, that is, in the case where the output pulse width Tx of the tracking adjuster 27 assumes a maximum width $Tx_{max}$, the rotary magnetic head assumes a position $H_{max}$ on the magnetic tape 21 as shown in FIG. 6. In this case, the rotary magnetic head scans along a scanning locus which lags a recorded track 40 which is to be scanned. On the other hand, in the case where the output pulse width of the tracking adjuster 27 assumes a minimum width $Tx_{min}$, the rotary magnetic head assumes a position $H_{min}$ and scans along a scanning locus which leads the recorded track 40. The envelope level of the reproduced FM signal changes depending on the area of the recorded track scanned by the rotary magnetic head. The envelope level of the reproduced FM signal becomes a maximum when the center of the scanning locus of the rotary magnetic head coincides with the center of the recorded track on the magnetic tape, that is, when the tracking phase angle is equal to 0°. The level of the reproduced FM signal decreases when the area of the recorded track scanned by the rotary magnetic head decreases, and such a decrease in the scanned area of the recorded track occurs when the tracking phase angle is leading or lagging the 0° tracking phase angle as may be seen from FIG. 7. Accordingly, it is possible to known that a tracking error exists by sampling the envelope detection signal of the reproduced FM signal, however, the mere sampling of the envelope detection signal is insufficient to know whether the tracking phase angle leads or lags with respect to the 0° tracking phase angle. For this reason, the discriminating circuit 25 shown in FIG. 3 discriminates whether the tracking phase angle leads or lags with respect to the 0° tracking phase angle. In FIG. 6, the illustration of the audio track and the control track is omitted for convenience' sake.

The CPU 36 generates a digital control signal $D_n$ at the time t1 shown in FIG. 5 to set the time constant (that is, the output pulse width Tx) of the tracking adjuster 27 to $T_n$, and in this state, enters the sampled data Ev1 at the time t1a. The CPU 36 generates a digital control signal $D_{n+1}$ at the next time t2 to set the output pulse width of the tracking adjuster 27 to $T_{n+1}$ which is greater than $T_n$ by a predetermined value $\Delta$, and in this state, enters the sampled data Ev2 at the time t2a. Further, the CPU 36 discriminates which of the two sampled data Ev1 and Ev2 is larger.

In the case shown in FIG. 5, Ev1 is larger than Ev2. Hence, the CPU 36 generates a digital control signal $D_{n-1}$ at the time t3 to set the output pulse width of the tracking adjuster 27 to $T_{n-1}$ which is smaller than $T_n$ by the predetermined value $\Delta$, and in this state, enters the sampled data Ev3 at the time t3a. In addition, the CPU 36 discriminates which of the two sampled data Ev2 and Ev3 is larger. In this case, Ev2 is smaller than Ev3, and Ev1 is larger than Ev3. Accordingly, as may be seen from FIG. 7, the rotary magnetic head is in a satisfactory tracking state. The output digital control signal of the CPU 36 converges within a range of ±1 bit.

On the other hand, in the case where the CPU 36 enters the sampled data Ev4 shown in FIG. 5 at the time t3a, the rotary magnetic head scans in a state where the tracking phase angle lags the 0° tracking phase angle as may be seen from FIG. 7, since Ev4 is larger than Ev1, and Ev1 is larger than Ev2. Hence, at the next sampling time which is one frame after the time t3a, the CPU 36 generates a digital control signal to set the output pulse width of the tracking adjuster 27 to $T_{n-2}$ which is smaller than $T_{n+1}$ by the predetermined value $\Delta$.

In the case where the rotary magnetic head assumes the position $H_{min}$ shown in FIG. 6, for example, and when it is assumed that the sampled data of the envelope detection signal of the reproduced FM signal is Ev5 shown in FIG. 7 and the CPU 36 generates a digital control signal $D_{na}$, the CPU 36 generates one frame thereafter a digital control signal $D_{(n+1)a}$ to set the output pulse width of the tracking adjuster 27 to a width which is still larger by the predetermined value Δ (one step). As a result, the rotary magnetic head is shifted by a predetermined quantity toward the position $H_{max}$ in FIG. 6, and the next sampled data becomes Ev6 shown in FIG. 7. The CPU 36 then discriminates which of the two sampled data Ev5 and Ev6 is larger. Since Ev5 is smaller than Ev6, the CPU 36 one frame thereafter generates a digital control signal $D_{(n+2)a}$ to set the output pulse width of the tracking adjuster 27 to a width which is still larger by the predetermined value Δ, and the rotary magnetic head is shifted toward the position $H_{max}$ in FIG. 6 by a predetermined quantity. By repeating these operations, the position of the rotary magnetic head converges to a position where the tracking phase angle is 0°.

The minimum steps with which the output pulse width Tx of the tracking adjuster 27 can be varied, becomes smaller as the number of bits of the output digital control signal of the CPU 36 increases. Hence, the output pulse width Tx of the tracking adjuster 27 can be varied in minute steps by using a large number of bits for the digital control signal. On the other hand, when only a small number of bits is used for the digital control signal, a change in ±1 bit will introduce wow and flutter. Accordingly, it is necessary to use a large number of bits for the digital control signal in order to minimize the effects of the wow and flutter.

It is possible to continuously generate the digital control signal $D_n$ from the CPU 36. In this case, a plurality of sampled data are entered into the CPU 36 to obtain an average value $\overline{Ev}_n$ in the state where the CPU 36 is generating the digital control signal $D_n$, and a plurality of sampled data are entered into the CPU 36 to obtain an average value $\overline{Ev}_{n+1}$ in the state where the CPU 36 is generating the digital control signal $D_{n+1}$. The CPU 36 discriminates which of the two averaged values $\overline{Ev}_n$ and $\overline{Ev}_{n+1}$ is larger, and the next digital control signal is determined based on the discriminated result. When $\overline{Ev}_n$ is smaller than $\overline{Ev}_{n+1}$, for example, the CPU 36 generates a digital control signal $D_{n+2}$ to set the output pulse width of the tracking adjuster 27 to a larger width than that obtained with the digital control signal $D_{n+1}$.

Therefore, immediately after the start of the reproducing mode of the VTR, it is possible to automatically carry out a tracking control within an extremely short period of time so that the rotary magnetic head accurately scans over the recorded track on the magnetic tape.

When a steady state is reached, the sampled data Ev1, Ev2, and Ev3 shown in FIG. 5 will be obtained repeatedly. Hence, after the steady state is reached, it is possible to compare the three sampled data Ev1, Ev2, and Ev3 to determine the largest sampled data and supply to the tracking adjuster 27 the digital control signal generated from the CPU 36 with respect to the largest sampled data of the three. In this case, due to the operation of the drum servo circuit and the capstan servo circuit of the VTR, only an extremely small tracking error occurs once the steady state is reached unless there is a large external disturbance (temperature change) or the like. For this reason, it is possible to change the sampling interval to an appropriate and sufficiently long sampling interval such as ten to thirty minutes, for example, although this appropriate and sufficiently long sampling interval will depend on the ambient temperature and the like. In this case, it is also possible to instantaneously re-adjust the output pulse width of the tracking adjuster 27 based on the sampled data so that the optimum tracking state is obtained. By lengthening the sampling interval after the steady state is reached, the number of times the rotary magnetic head is shifted per unit time decreases in the steady state. In other words, the number of times the rotary magnetic head is shifted per unit time in the steady state is considerably small compared to that immediately after the start of the reproducing mode, and such a decrease in the number of shifts is advantageous when considering the undesirable effects of the wow and flutter described before.

Next, description will be given with respect to an embodiment of the tracking adjuster 27 by referring to FIG. 8. In FIG. 8, those parts which are the same as those corresponding parts in FIG. 4 are designated by the same reference numerals. The tracking adjuster 27 shown in FIG. 8 comprises a monostable multivibrator 42, a variable resistor Rv, and a capacitor C. A constant power source voltage Vcc is applied to a terminal 43. The output control signal of the control signal generating circuit 26 (for example, the D/A converter 37 shown in FIG. 4) shown in FIG. 3 is applied to a terminal 44 so as to vary the resistance of the variable resistor Rv. The time constant $\tau_1 = R_vC$ changes depending on the control signal applied to the terminal 44, and thus, the duty cycle of the rotation detection pulse signal which is obtained from the rotational phase detector 15 and is applied to the terminal 29 is changed in accordance with the change in the time constant $\tau_1$. An output pulse signal of the monostable multivibrator 42 is supplied to the phase comparator 17 through the terminal 30.

Another embodiment of the tracking adjuster 27 is shown in FIG. 9. In FIG. 9, those parts which are the same as those corresponding parts in FIG. 8 are designated by the same reference numerals. The tracking adjuster 27 shown in FIG. 9 comprises a monostable multivibrator 46, a resistor Rc, and a capacitor C. For example, a chip TC4538BP manufactured by Tokyo Shibaura Electric Co., Ltd. of Japan may be used for the monostable multivibrator 46. The output control signal of the control signal generating circuit 26 (for example, the D/A converter 37 shown in FIG. 4) shown in FIG. 3 is applied to a terminal 45. A time constant $\tau_2 = R_cC$ is constant, however, the level of the control signal applied to the terminal 45 changes. As a result, the duty cycle of the rotation detection pulse signal which is obtained from the rotational phase detector 15 and is applied to the terminal 29 is changed in accordance with the change in the level of the control signal applied to the terminal 45. An output pulse signal of the monostable multivibrator 46 is supplied to the phase comparator 17 through the terminal 30.

FIG. 10 is a system block diagram showing an essential part of the second embodiment of the tracking control system according to the present invention. In FIG. 10, those parts which are the same as those corresponding parts in FIG. 4 are designated by the same reference numerals, and description thereof will be omitted. A CPU 52 supplies a 4-bit digital signal to a D/A converter 52 so that the D/A converter 53 generates a staircase which increases from zero in steps with a predetermined period. The D/A converter 53 comprises resistors having resistances of R, 2R, 4R, and 8R, and an operational amplifier 54. The output staircase of the D/A converter 53 is supplied to a comparator 55 and is compared with the envelope detection signal obtained from the input terminal 31. For example, the comparator 55 compares the levels of the envelope detection signal e shown in FIG. 11 and the output staircase f of the D/A converter 53, and generates a signal having a polarity which is inverted when the level of the staircase f becomes larger than the level of the envelope detection signal e. This output signal of the comparator 55 is supplied to the CPU 52, and the CPU 52 enters a level Ev7 of the staircase f as the sampled data when the polarity of the output signal of the comparator 55 is inverted.

In other words, a part of the CPU 52 which generates the digital signal supplied to the D/A converter 53, the D/A converter 53, and the comparator 55 constitute the sampling circuit 24 shown in FIG. 3. In the present embodiment, the tracking adjuster 27 is controlled by performing operations similar to those performed in the first embodiment described before.

The reproducing sensitivity differs for each rotary magnetic head. For this reason, the sampling period is selected to one frame in the embodiment described heretofore so that the sampled data is obtained from the envelope detection signal of the FM signal which is reproduced from the same rotary magnetic head. However, the sampling period may be selected to a plurality of frames. In addition, by taking measures so that the CPU 36 or 52 generates a digital control signal for setting the output pulse width Tx of the tracking adjuster 27 to a center value in the variable range in the initial state before the magnetic tape starts to move, it is possible to shorten the time required to obtain the optimum tracking state in the steady state.

In the second embodiment, the staircase f is generated from the time t1a when the data to be compared is obtained as shown in FIG. 12. Hence, even when the level of the envelope detection signal is the same at the time t1a, the envelope detection signal may change as indicated by e1 or e2 after the time t1a. An actual sampling time tb for the envelope detection signal e1 differs from an actual sampling time tc for the envelope detection signal e2. In the case where the number of times the signal processing is performed in the CPU 52 is small or the machine cycle time is short, the time it takes to detect that the level of the staircase f has become larger than that of the envelope detection signal can be shortened. As a result, it is possible to sample a data in the vicinity of the time t1a, and the accuracy with which the sampled data is obtained can be increased independent of the level change in the staircase f. However, in the case where the machine cycle time of the CPU 52 is relatively long, times (tb−t1a) and (tc−t1a) are not short. Thus, when obtaining the sampled data of the envelope detection signal after the time t1a, it takes n steps to obtain the sampled data of the envelope detection signal e1 and n+2 steps to obtain the sampled data of the envelope detection signal e2, and a difference of two steps will be introduced. For this reason, although the levels of the envelope detection signals e1 and e2 are the same at the time t1a, the actual sampled data will be different for the two envelope detection signals e1 and e2 because of the difference of two steps.

Accordingly, description will now be given with respect to an embodiment in which the sampled data is obtained with a high accuracy even when the machine cycle time of the CPU is relatively long. FIG. 13 is a system block diagram showing an essential part of the third embodiment of the tracking control system according to the present invention. In FIG. 13, those parts which are the same as those corresponding parts in FIG. 10 will be designated by the same reference numerals, and description thereof will be omitted. A drum control pulse signal shown in FIG. 14(A) having a period of one frame is applied to an input terminal 62 and is supplied to a sampling control pulse generator and delay circuit part 60. As will be described later, the part 60 delays the drum control pulse signal by a predetermined delay time T so as to perform a sampling with a predetermined timing and also shapes the drum control pulse signal so as to generate a sampling control pulse signal shown in FIG. 14(B) having a period of two fields (one frame). For example, the part 60 comprises a first monostable multivibrator 63 which is for adjusting the timing and is triggered by the drum control pulse signal, and a second monostable multivibrator 64 which is for adjusting the pulse width and is triggered by an output of the first monostable multivibrator 63.

On the other hand, an envelope detection signal indicated by a solid line in FIG. 15 is supplied to a sample and hold (S/H) circuit 61 through the input terminal 31. The part 60 generates the sampling control pulse signal shown in FIG. 14(B) at times t4a and t5a which are respectively the predetermined delay time T after times t4 and t5 when the drum control pulse signal is received through the input terminal 62. The envelope detection signal is sampled in the S/H circuit 61 responsive to the sampling control pulse signal from the part 60, and the sampled data is held until the next sampling time. As indicated by a one-dot chain line in FIG. 15, the sampled and held data has a level Ev11 from the time t4a to the time t5a and a level Ev12 after the time t5a. The sampled and held data from the S/H circuit 61 is supplied to one input terminal of the comparator 55 and is compared with the output staircase of the D/A converter 53. The D/A converter 53 generates the staircase (comparison signal) based on the output digital signal of the CPU 52 from the times t4a and t5a shown in FIG. 15. The comparator 55 generates a signal having a polarity which is inverted when the level of the staircase becomes larger than the level of the sampled and held data from the S/H circuit 61. This output signal of the comparator 55 is supplied to the CPU 52, and the CPU 52 enters a level of the staircase as the sampled data when the polarity of the output signal of the comparator 55 is inverted. Hence, the CPU 52 discriminates which of the sampled data Ev11 and Ev12 is larger and generates the digital control signal based on the discriminated result. The output digital control signal of the CPU 52 is passed through the D/A converter 37 and is supplied to the tracking adjuster 27 so as to variably control the output pulse width of the tracking adjuster 27. It is of course possible to obtain an average value of a plurality of sampled data for every predetermined number of sampled data and discriminate which of two consecutively obtained average values is larger.

In the present embodiment, an output FM signal of a rotary magnetic head CH2 having the lower reproduced FM signal level out of two rotary magnetic heads CH1 and CH2 is sampled. Further, the sampling times t4a and t5a are respectively selected substantially at the center of one field. The tape moving speed is controlled by the tracking adjuster 27 by entering the sampled data at the above sampling times, and the scanning position of the rotary magnetic head is adjusted so that the maximum output is obtained substantially at the center of the field of the reproduced FM signal from the rotary magnetic head CH2. Compared to the case where the sampling is performed at the beginning or end of one field, it is possible to reduce the error between the recorded track on the magnetic tape and the scanning locus of the rotary magnetic head and hence obtain a reproduced picture of a high picture quality when the sampling is performed substantially at the center of one field.

Figure 16:
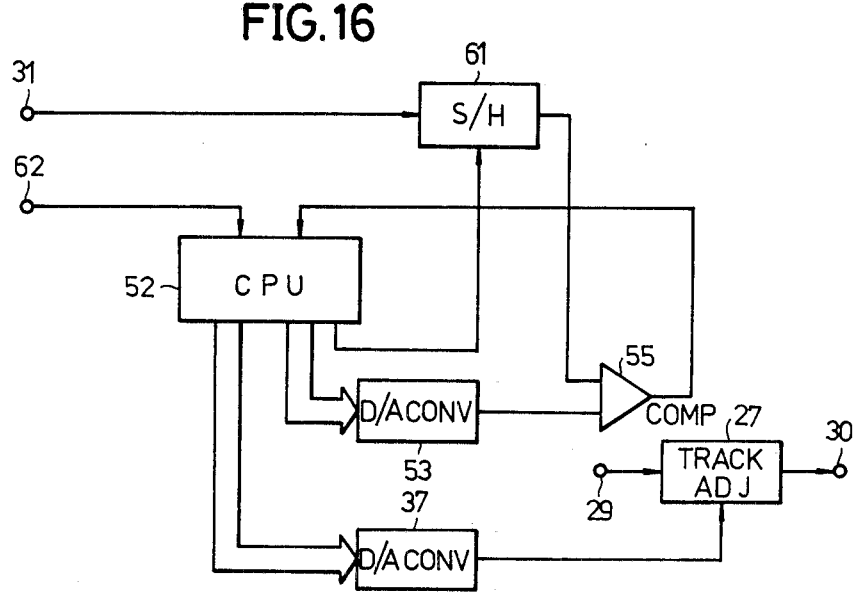
FIG. 16 is a system block diagram showing an essential part of a fourth embodiment of the tracking control system according to the present invention.

FIG. 16 is a system block diagram showing an essential part of the fourth embodiment of the tracking control system according to the present invention. In FIG. 16, those parts which are the same as those corresponding parts in FIG. 13 are designated by the same reference numerals, and description thereof will be omitted. According to the present embodiment, the operation of the part 60 shown in FIG. 13 is performed within the CPU 52 by employing a suitable program.

Figure 17:
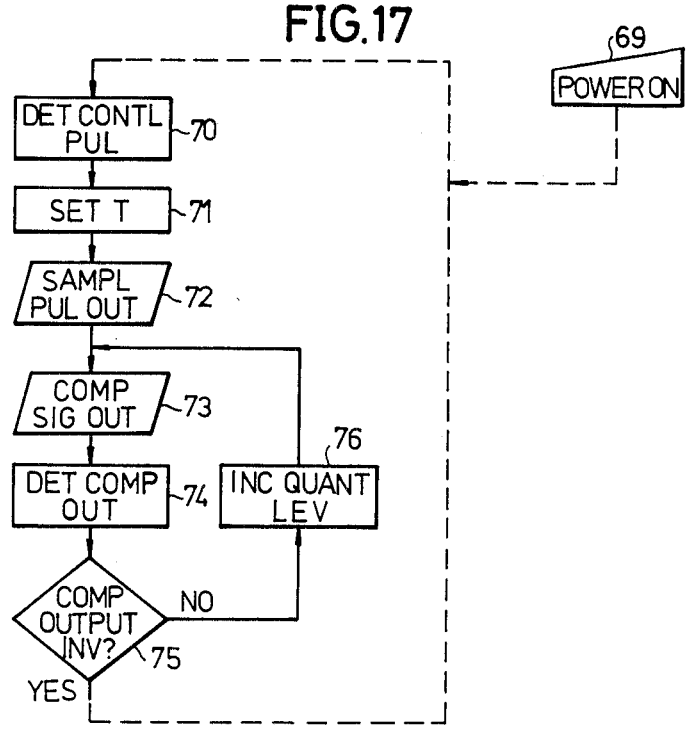
FIG. 17 is a flow chart for explaining the operation of a CPU in the block system shown in FIG. 16.

The operation of the CPU 52 will be described in conjunction with the flow chart shown in FIG. 17. After a power source is turned ON in a step 69, the CPU 52 sets the value of the output signal thereof which is supplied to the D/A converter 53 to approximately a center value in a quantization level (step) range, and the control of the capstan motor is started. For example, in the case where the D/A converter 53 is a 5-bit converter, the value of the output signal of the CPU 52 supplied to the D/A converter 52 is set to "15" which is approximately the center value in a quantization level range of "0" to "31". After setting initial output values, the CPU 52 generates the output values through output ports thereof, and the drum control pulse signal is detected in a step 70. Based on the detected drum control pulse signal, the CPU 52 sets the sampling pulse time (the predetermined delay time) T described before in a step 71. A sampling pulse signal is supplied to the S/H circuit 61 in a step 72 so that the data of the envelope detection signal is sampled and held and then supplied to the comparator 55. A signal is generated and supplied to the D/A converter 53 in a step 73 so that the staircase (comparison signal) is generated from the D/A converter 53. An output of the comparator 55 is detected in a step 74, and a discrimination is performed in a step 75 so as to determine whether or not the output of the comparator 55 is inverted. When the discrimination result in the step 75 is NO, the quantization level is incremented by "1" in a step 76 and the operation is returned to the step 73. On the other hand, when the discrimination result in the step 75 is YES, the CPU 52 enters the level of the comparison signal as the sampled data as described before. Further, as described before, the CPU 52 discriminates which of the two successive sampled data (or two successively obtained average values of the sampled data) is larger, and variably controls the output pulse width of the tracking adjuster 27 through the D/A converter 37 based on the discriminated result so as to adjust the scanning position of the rotary magnetic head. The operation described above is repeated depending on the sampling time interval (calibration time interval), and the optimum tracking state is maintained.

On the other hand, in the first embodiment described before, the CPU 36, the A/D converter 35, and the D/A converter 37 are all 4-bit devices in the case where the digital signal to be processed has a quantization number of four bits. The output pulse width of the tracking adjuster 27 is variably controlled based on the data obtained through a series of operations performed in the CPU 36.

In the case where the quantization nunber is equal to four bits which is relatively small, is is possible to use inexpensive 4-bit devices for the CPU 36, the A/D converter 35, and the D/A converter 37. However, a relatively large wow and flutter is introduced by the use of such 4-bit devices, and the accuracy of the tracking control is not extremely high. In other words, the tracking control range is set so that the rotary magnetic head can be shifted by at least one track pitch (that is, one frame) in the track width direction by controlling the tape moving speed, but in the case where the quantization number is equal to four bits, the quantization level is "16" ($=2^4$) and the tracking control is carried out in units of 1/16 frame. Accordingly, the wow and flutter is introduced in the reproduced picture in units of 1/16 frame every time the tracking control is carried out (that is, when the rotary magnetic head is shifted).

In addition, the discrimination to determine whether or not the rotary magnetic head is accurately scanning over the recorded track on the magnetic tape is performed with a tolerance of 1/16 frame, and the accuracy of the tracking control is not extremely high.

The wow and flutter and the accuracy of the tracking control are dependent on the quantization number, and the wow and flutter can be reduced and the accuracy of the tracking control can be improved by increasing the quantization number. However, when the quantization number is simply increased, it is necessary to increase the number of bits of the CPU 36, the A/D converter 35, and the D/A converter 37. But devices using a larger number of bits are expensive, especially in the case of the CPU 36 and the A/D converter 35, and the manufacturing cost of the circuit will increase when the devices using a large number of bits are employed.

Next, description will be given with respect to an embodiment wherein the CPU is a 4-bit device, for example, but the tracking control can be performed with a high accuracy which is substantially equivalent to the accuracy obtained when a device using more than four bits is employed.

Figure 18:
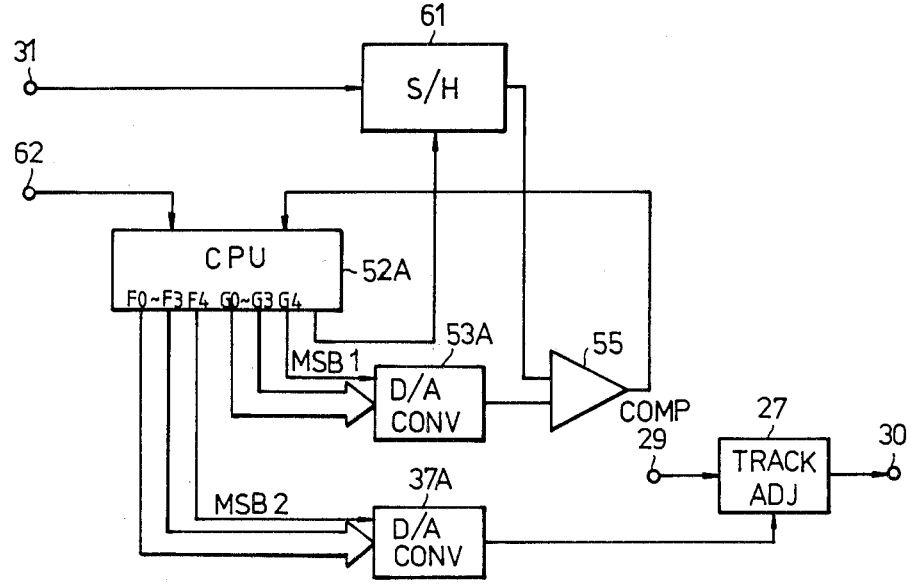
FIG. 18 is a system block diagram showing an essential part of a fifth embodiment of the tracking control system according to the present invention.

FIG. 18 is a system block diagram showing an essential part of the fifth embodiment of the tracking control system according to the present invention. In FIG. 18, those parts which are the same as those corresponding parts in FIG. 16 are designated by the same reference numerals, and description thereof will be omitted. In FIG. 18, an envelope detection signal indicated by a solid line I in FIG. 18 is applied to the input terminal 31, and the drum control pulse signal is applied to the input terminal 62 at times t10 and t13 shown in FIG. 19. The drum control pulse signal from the input terminal 62 is supplied to a 4-bit CPU 52A. The CPU 52A operates as will be described in conjunction with the flow charts shown in FIGS. 20A and 20B. When a power source is turned ON in a step 80 shown in FIG. 20A, the CPU 52A sets the value of a 4-bit output signal which is generated through output ports F0 through F3 thereof to approximately a center value in a quantization level range in a step 81. This 4-bit output signal from the output ports F0 through F3 is supplied to a D/A converter 37A in a step 82. For example, in the case where the D/A converter 37A is a 5-bit converter, the value of the output signal of the CPU 52A obtained through the output ports F0 through F3 is set to "15" which is approximately the center value in a quantization level range of "0" to "31". Accordingly, a digital signal in which all of the bits are "1" is first obtained from the output ports F0 through F3. A step 83 discriminates whether or not an internal memory B thereof is set. Since the memory B is initially not set (that is, the stored data is "0" and the memory B is in a reset state), the discrimination result in the step 83 is NO and a step 84 resets a most significant bit MSB2 of a 5-bit data which is obtained through the output ports F0 through F4 of the CPU 52A. This MSB2 is also supplied to the D/A converter 37A. The resetting of the MSB2 means that a data "0" is obtained from the output port F4. As will be described later, a 5-bit data is obtained through output ports G0 through G4 of the CPU 52A, and a most significant bit of this 5-bit data is represented by MSB1. A least significant bit of the 5-bit data from the output ports F0 through F5 is obtained from the output port F0, and a least significant bit of the 5-bit data from the output ports G0 through G4 is obtained from the output port G0.

The D/A converters 37A and 53A are 5-bit converters having a similar construction, and the D/A converter 37A is supplied with the control signal from the output ports F0 through F4 having the quantization level "15". The D/A converter 37A converts this control signal into an analog signal and supplies this analog signal to the tracking adjuster 27. AS a result, the output pulse width of the tracking adjuster 27 is controlled to approximately the center value in the pulse width varying range.

A step 85 shown in FIG. 20B resets an internal memory A of the CPU 52A, and the CPU 52A waits for the incoming drum control pulse signal. When a step 86 detects the incoming drum control pulse signal at the time t10 shown in FIG. 19, a step 87 sets a timer for measuring a lapse of a predetermined time $\Delta t$. A step 88 generates the sampling pulse signal at the time t11 when the predetermined time $\Delta t$ elapses from the detection of the incoming drum control pulse signal, and the sampling pulse signal is supplied to the S/H circuit 61 shown in FIG. 18. A step 89 resets the MSB1 from the output port G4 to "0". Accordingly, the S/H circuit 61 samples a level Ev21 of the envelope detection signal indicated by the solid line I in FIG. 19 responsive to the sampling pulse signal, and the sampled data is held for one frame until a time t14 when the next sampling pulse signal is obtained. The sampled and held data is supplied to one input terminal of the comparator 55.

For example, the predetermined time $\Delta t$ measured by the timer is selected to a time period of approximately $\frac{1}{2}$ field, so that the effect of the tracking control in the reproduced picture is a maximum in one frame. Hence, out of the two rotary magnetic heads which independently scan over two mutually adjacent tracks on the magnetic tape, the envelope detection signal of the reproduced FM signal is sampled at a time when one of the rotary magnetic heads is scanning over approximately the center of one track. In this case, it is desirable to sample the envelope detection signal of the reproduced FM signal which is obtained from the rotary magnetic head having the lower sensitivity of the two so as to avoid saturation level.

Next, a step 90 generates a digital comparison signal having a quantization level "1" from the output ports G0 through G4 of the CPU 52A. This digital comparison signal is supplied to the D/A converter 53A wherein the signal is converted into an analog comparison signal, and the analog comparison signal is supplied to the other input terminal of the comparator 55. The comparator 55 compares the sampled and held data from the S/H circuit 61 with the analog comparison signal, and generates the signal having the polarity which is inverted when the level of the comparison signal is greater than the sampled and held data. The output signal of the comparator 55 is supplied to the CPU 52A. A step 91 detects the output signal of the comparator 55, and a step 92 discriminates whether or not the polarity of the output signal of the comparator 55 is inverted. When the discrimination result in the step 92 is NO, a step 93 increments the quantization level of the digital comparison signal by "1". A step 94 discriminates whether or not the quantization level of the digital comparison signal is equal to "15". When the discrimination result in the step 94 is YES, a step 95 sets the MSB1 from the output port G4 to "1", and a step 96 sets the memory A. The operation is then returned to the step 90 so as to generate the digital comparison signal having the incremented quantization level.

Figure 19:
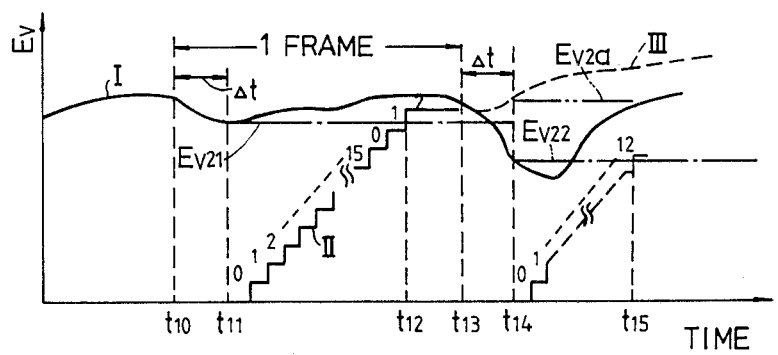
FIG. 19 shows the envelope detection signal for explaining the operation of the block system shown in FIG. 18.

Accordingly, until the output signal of the comparator 55 is inverted, the CPU 52A generates within the sampling interval of one frame a digital comparison signal having a quantization level which is successively incremented by "1" up to a maximum of "32" ($=2^{4+1}$). As a result, a staircase II shown in FIG. 19 is generated from the D/A converter 53A from the sampling time t11. When the level of the staircase II becomes greater than the level Ev21 of the sampled and held data at a time t12 when the quantization level is "18" ($=15+3$) as shown in FIG. 19, the output signal of the comparator 55 is inverted. The inversion of the output signal of the comparator 55 is detected in the step 92, and the discrimination result in the step 92 becomes YES. Because the CPU 52A is a 4-bit CPU, a step 97 enters and stores as a data $D_1$ a 4-bit data which is obtained from the output ports G0 through G3 out of the digital comparison signal. The data $D_1$ is stored into a predetermined memory which is different from the memories A and B. As described before, the value of the MSB1 is stored in the memory A.

A step 98 shown in FIG. 20A then discriminates whether or not a round of the processes shown in FIGS. 20A and 20B has been performed for an even number of times. In this stage, the CPU 52A has not yet performed the round of the processes shown in FIGS. 20A and 20B, and the number of times the round of the processes is performed is equal to zero. Zero is discriminated as an even number, and the discrimination result in the step 98 is YES. A step 99 stores the 4-bit data $D_1$ as a data $D_2$. A step 100 obtains a data $D_{0+1}$ by incrementing by "1" the quantization level of the 4-bit output signal from the output ports F0 through F3. The discrimination of the step 98 is performed so that it is possible to discriminate which of the present sampled data and the immediately previous sampled data is larger.

Next, a step 101 detects whether or not the data $D_{0+1}$ overflows. Since all of the bits of the 4-bit output signal from the output ports F0 through F3 are initially set to "1", the data $D_{0+1}$ overflows and the discrimination result in the step 101 is YES. A step 102 sets the memory B which stores the value of the MSB2 so that a value "1" is stored in the memory B. The step 82 generates from the output ports F0 through F3 a 4-bit output signal in which all of the bits are "0" because of the overflow, and the step 83 discriminates whether or not the memory B is set. The discrimination result in the step 83 is YES in this case, and a step 103 sets the MSB2. The step 85 shown in FIG. 20B resets the memory A. Accordingly, the D/A converter 37A is supplied with a digital control signal having a quantization level of "16".

By performing the steps 86 through 96 shown in FIG. 20B, the sampling pulse signal is generated at a time t14 which is the predetermined time Δt after the time t13 shown in FIG. 19 when the incoming drum control pulse signal is detected, and the quantization level of the digital comparison signal is incremented by "1" from the time t14. When it is assumed that the level of the output staircase of the D/A converter 53A becomes greater than a level Ev22 of the envelope detection signal which is sampled at the time t14 when the quantization level of the digital comparison signal becomes "12" at a time t15 as shown in FIG. 19, the step 97 stores as the data $D_1$ the value of the lower four bits of the digital comparison signal at the time t15. The steps 95 and 96 are not performed in this case, and thus, the memory A remains reset by the step 85 described before.

The number of times the round of the processes is performed is equal to one which is an odd number, and the discrimination result in the step 98 shown in FIG. 20A becomes YES. A step 104 discriminates whether or not a present value $D_1^*$ is greater than or equal to a previous value $D_2^*$ so as to determine which of the present and previous data $D_1$ and $D_2$ is larger and which of the present and previous contents of the memory A is larger. The present value $D_1^*$ is the value of a 5-bit data having the present content of the memory A as the MSB thereof and the data $D_1$ as the lower four bits thereof. The previous value $D_2^*$ is the value of a 5-bit data having the previous content of the memory A as the MSB thereof and the data $D_2$ as the lower four bits thereof. In the present case, the previous value $D_2^*$ is "18" and the present value $D_1^*$ is "12", and the discrimination result in the step 104 is NO. Hence, a step 106 decrements the quantization level of the 4-bit output signal by "1" and obtains a data $D_{0-1}$. A step 107 stores the data $D_{0-1}$, and a step 108 discriminates whether or not the memory B is reset. Since the memory B is set in the step 102 described before, the discrimination result in the step 108 is NO, and a step discriminates whether or not the data $D_{0-1}$ is "14" or "15". Because the data $D_{0-1}^*$ is "14", the discrimination result in the step 109 is YES, and a step 110 resets the memory B. A control signal having the value "14" is thereafter generated and obtained through the output ports F0 through F4 by performing the steps 82 through 84.

On the other hand, in the case where the envelope detection signal from the input terminal 31 changes as indicated by a phantom line III in FIG. 19, a level Ev22a (Ev22a is greater than Ev21) of the envelope detection signal is sampled in the S/H circuit 61 at the time t14 and is held as indicated by a two-dot chain line in FIG. 19 until the next sampling pulse signal is obtained. In this case, the discrimination result in the step 104 is YES, and a step 105 stores into the predetermined memory the data $D_{0+1}$ ("16" in this case) which is obtained in the step 100. A control signal having the value "16" is thereafter generated and obtained through the output ports F0 through F4 by performing the steps 82, 83, and 103.

Next, the number of times the round of processes is performed becomes equal to an even number by performing the round of the processes shown in FIGS. 20A and 20B, and the discrimination result in the step 98 becomes YES. Hence, the quantization level of the 4-bit output signal from the output ports F0 through F3 having the value "16" is incremented by "1", and operations similar to those described above are repeated.

Therefore, the tracking control is carried out responsive to the 5-bit digital signal by use of the 4-bit CPU 52A, and the wow and flutter is reduced since the wow and flutter only occurs in units of 1/32 frame. In addition, the tracking control is performed with a tolerance of 1/32 frame which is small, and the accuracy of the tracking control is improved compared to the first embodiment.

For example, it is also possible to use the 4-bit CPU 52A and carry out the tracking control responsive to a 6-bit digital signal as may be easily understood from the description given heretofore. Hence, description on the tracking control responsive to the 6-bit digital signal or the like will be omitted.

As is well known, the scanning locus of the rotary magnetic head does not perfectly coincide with the recorded track on the magnetic tape due to the precision of the mechanisms of the VTR, the moving state of the magnetic tape and the like, and the rotary magnetic head undergoes a slight zigzag movement with respect to the recorded track. Accordingly, the envelope detection signal which is obtained by sampling the output reproduced FM signal of one rotary magnetic head at times when the same one rotary magnetic head scans the same position of a plurality of recorded tracks on the magnetic tape also includes a level fluctuation component. For this reason, when the tracking control is carried out based on every sampled data, the control signal which controls the output pulse width of the tracking adjuster to the optimum width also includes a fluctuation component. The effect of the level fluctuation component becomes notable with increasing number of bits of the A/D converter for converting the output signal of the S/H circuit which samples and holds the envelope detection signal into a digital signal and for supplying this digital signal to the CPU. However, the tolerance of the tracking control must be small in order to improve the accuracy of the tracking control, and the quantization number (number of bits of the A/D converter) must hence be increased to improve the accuracy of the tracking control. Therefore, there are two conflicting conditions which need to be satisfied in that the number of bits of the A/D converter must be reduced in order to reduce the effect of the level fluctuation component, but the number of bits of the A/D converter must be increased in order to improve the accuracy of the tracking control.

Further, when carrying out the tracking control by the adjustment of the tracking adjuster, it is impossible to quicken the response speed due to the inertia of the capstan motor. Hence, a large error is introduced in the tracking control if the sampling interval is not set to a sufficiently long time. In addition, when the tracking control is carried out by the means described above, there is a problem in the operation at the initial state of the reproducing mode, and there are disadvantages in that it takes time to adjust the tracking adjuster to the optimum setting and the quality of the reproduced picture is poor until the adjustment of the tracking adjuster is completed.

Accordingly, description will now be given with respect to an embodiment wherein the tracking control is carried out based on every sampled data in the initial state of the tracking control and the tracking control is carried out based on average values of a plurality of sampled data after a steady state of the tracking control is reached.

Figure 21:
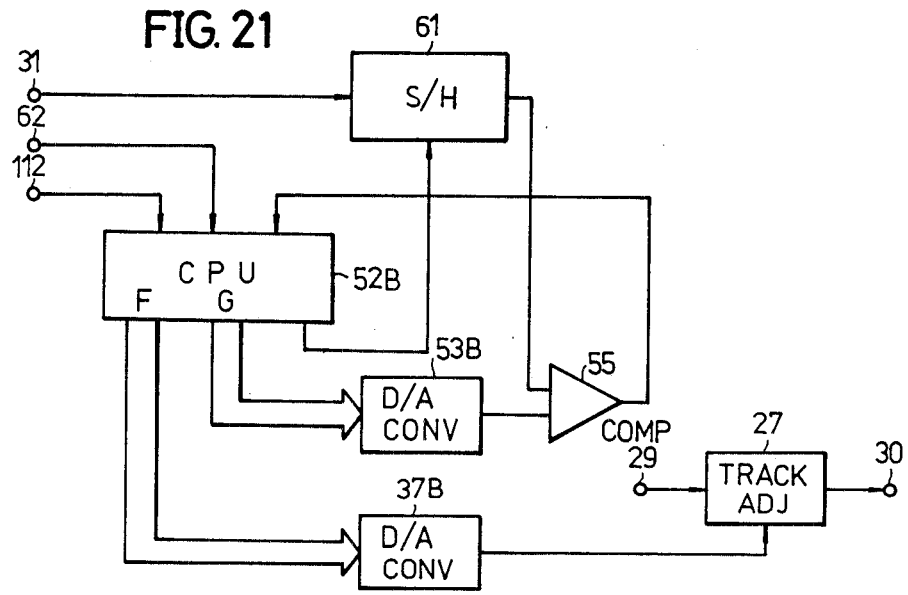
FIG. 21 is a system block diagram showing an essential part of a sixth embodiment of the tracking control system according to the present invention.

FIG. 21 is a system block diagram showing an essential part of the sixth embodiment of the tracking control system according to the present invention. In FIG. 21, those parts which are the same as those corresponding parts in FIG. 18 are designated by the same reference numerals, and description thereof will be omitted. The envelope detection signal of the reproduced FM signal reproduced by the rotary magnetic head is applied to the input terminal 31 and is supplied to the S/H circuit 61. This envelope detection signal is indicated by the solid line I in FIG. 19. On the other hand, the drum control pulse signal having the period of one frame is applied to the input terminal 62 and is supplied to a CPU 52B. The CPU 52B generates the sampling pulse signal having a preset time interval (for example, one frame) from the drum control pulse signal. The mode discrimination signal which assumes a low level in the normal reproduction mode and a high level in the special reproduction mode such as the changed speed reproduction mode and the still picture reproduction mode is applied to an input terminal 112 and is supplied to the CPU 52B. The CPU 52B supplies two kinds of n-bit signals to respective D/A converters 37B and 53B, where n is equal to five, for example.

An embodiment of the operation of the CPU 52B will be described in conjunction with the flow charts shown in FIGS. 22A and 22B. First, when a power source is turned ON in a step 120 shown in FIG. 22A, a step 121 sets the digital signal (output value) to approximately a center value of a maximum quantization level. A step 122 supplies the digital signal to the D/A converter 37B through an output port F. In the case where n=5, for example, the step 121 sets the 5-bit digital signal to a value indicating the quantization level "15" which is approximately the center value of the maximum quantization level "32" ($=2^5$). The 5-bit digital signal having the quantization level "15" is obtained through the output port F of the CPU 52B and is supplied to the D/A converter 37B in the step 122. The D/A converter 37B converts the 5-bit digital signal to an analog control voltage and supplies the analog control voltage to the tracking adjuster 27 shown in FIG. 21. In the present embodiment, the tracking adjuster 27 comprises a monostable multivibrator such as that shown in FIG. 8, for example. Hence, a leading edge of the output pulse signal of the tracking adjuster 27 obtained through the output terminal 30 is synchronized with the rotation detection pulse signal applied to the input terminal 29, and the output pulse width of the tracking adjuster 27 is approximately inversely proportional to the control voltage from the D/A converter 37B.

Figure 23:
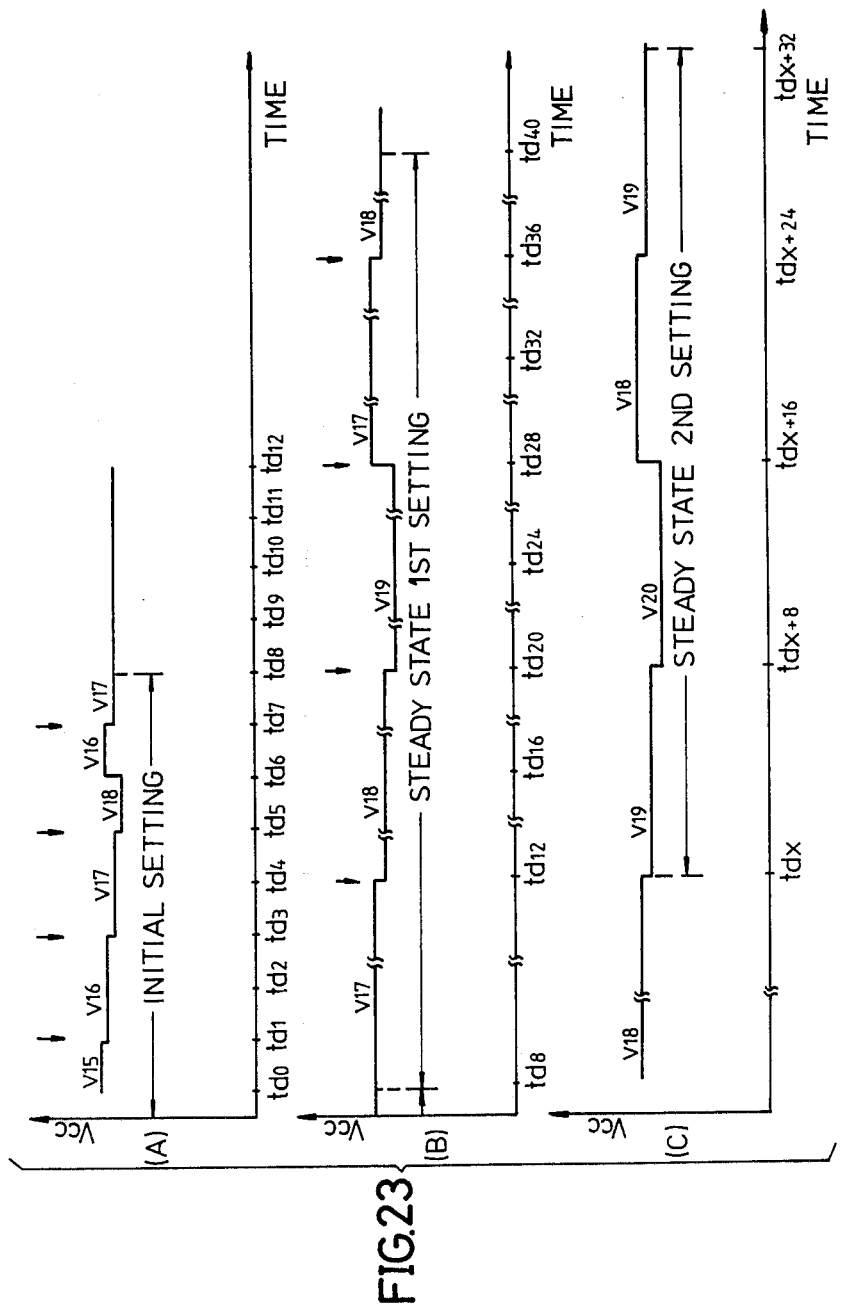
FIGS. 23(A) through 23(C) respectively show the change in a control voltage for the tracking adjuster.

FIGS. 23(A) through 23(C) show the change in the control voltage supplied to the tracking adjuster 27. In FIGS. 23(A) through 23(C), the power source is turned ON at a time $t_{d0}$, and a time interval $t_{dk}-t_{dk-1}$ corresponds to one frame. Further, a subscript j of a control voltage Vj represents the quantization level of the 5-bit digital signal which is obtained through the output port F of the CPU 52B. Accordingly, in a time period of one frame from the time $t_{d0}$ to a time $t_{d1}$, a control voltage V15 having the quantization level "15" is supplied to the tracking adjuster 27.

A step 123 enters the sampled data of the envelope detection signal. The operation of entering the sampled data is performed as follows. When it is assumed that the drum control pulse signal is received at the times t10 and t13 shown in FIG. 19, the sampling pulse signal is generated from the CPU 52B at the times t11 and t14 which are the predetermined time $\Delta t$ after the respective times t10 and t13 and is supplied to the S/H circuit 61. Hence, the S/H circuit 61 samples the level Ev21 of the envelope detection signal indicated by the solid line I in FIG. 19 at the time t11, for example, responsive to the sampling pulse signal. The S/H circuit 61 holds the sampled level Ev21 for one frame until the time t14 when the next sampling pulse signal is received. The sampled and held level Ev21 is supplied to one input terminal of the comparator 55.

Next, the CPU 52B generates a 5-bit digital comparison signal having the quantization level "1", for example, and supplies this digital comparison signal to the D/A converter 53B. The digital comparison signal is converted into an analog comparison signal in the D/A converter 53B and is supplied to the other input terminal of the comparator 55. The comparator 55 compares the sampled and held level with the level of the analog comparison signal and generates a signal having a polarity which is inverted when the level of the analog comparison signal (staircase which will be described later) becomes greater than the sampled and held level. The output signal of the comparator 55 is supplied to the CPU 52B.

The CPU 52B generates the digital comparison signal having the quantization level which is successively incremented by "1" until the output signal of the comparator 55 is inverted. Accordingly, the output signal of the D/A converter 53B is the staircase II shown in FIG. 19 which successively increases in steps from the sampling time t11. When the level of the staircase II becomes greater than the level Ev21 of the sampled and held data at the time t12 when the quantization level is "18" (=15+3) as shown in FIG. 19, the output signal of the comparator 55 is inverted. The inversion of the output signal of the comparator 55 is detected in the CPU 52B, and the CPU 52B stores as the sampled data the digital comparison signal which is generated therein at the time t12. Similarly, the level Ev22 of the envelope detection signal is sampled at the time t14 shown in FIG. 19 and is held for one frame. The sampled and held level obtained from the S/H circuit 61 becomes smaller than that of the output staircase of the D/A converter 53B having the quantization level "12" at the time t15, and thus, the output signal of the comparator 55 is inverted at the time t15. The CPU 52B enters as the sampled data the digital comparison signal which has the quantization level "12" and is generated therein.

When the CPU 52B enters one sampled data, a step 124 discriminates whether or not the mode discrimination signal indicating the special reproduction mode is applied to the input terminal 112 shown in FIG. 21. When the discrimination result in the step 124 is YES, a step 125 resets an internal memory C of the CPU 52B and the operation is returned to the step 123. Hence, in the special reproduction mode, the tracking control is not carried out. On the other hand, in the case of the normal reproduction mode, the discrimination result in the step 124 is NO, and a step 126 discriminates whether or not the memory C is set. The memory C is in the reset state in the initial state, and the discrimination result in the step 126 is NO. A step 127 stores a present sampled data $D_i$ entered in the step 123 described before into a predetermined external random access memory (RAM, not shown), and a step 128 discriminates whether or not the sampled data has been entered for an even number of times. Since the sampled data has been entered once by this stage, the discrimination result in the step 128 is NO. A step 129 stores the sampled data $D_i$ as a sampled data $D_{i-1}$ into a predetermined memory, and a step 130 increments the quantization level of the output value by "1". The output value (digital signal) obtained in the step 130 is obtained through the output port F in the step 122. Accordingly, the digital signal having the quantization level "16" is obtained from the output port F at the time $t_{d1}$, and a control voltage V16 is supplied to the tracking adjuster 27 from the time $t_{d1}$ to a time $t_{d2}$ which is one frame thereafter as shown in FIG. 23(A). At this point in time, however, the output value stored in the memory has the quantization level "15".

The CPU 52B again performs the steps 123, 124, and 126 and stores the present sampled data $D_i$ which is sampled at the time $t_{d1}$, and the steps 127 and 128 are performed. At this stage, the sampled data has been entered twice and the discrimination result in the step 128 is YES. A step 131 shown in FIG. 22B discriminates whether or not the present sampled data $D_i$ is greater than or equal to the previous sampled data $D_{i-1}$ obtained immediately before the present sampled data $D_i$. In the case where the present sampled data $D_i$ is greater than the previous sampled data $D_{i-1}$, for example, the discrimination result in the step 131 is YES and a step 132 discriminates whether or not the present output value is equal to the previous output value. At this stage, there is no previous output value and the present output value is "15". Hence, the discrimination result in the step 132 is NO and a step 133 stores the present output value "15" into the predetermined memory. A step 134 increments the output value "15" by "1" and stores the incremented output value at another address in the memory. After the step 134, the operation advances to the step 122 shown in FIG. 22A and the digital signal having the quantization level "16" is obtained through the output port F at a time $t_{d2}$. As shown in FIG. 23(A), the control voltage changes at times $t_{d5}$, $t_{d6}$, and $t_{d7}$ and the output pulse width of the tracking adjuster 27 changes accordingly. As a result, the relative scanning position of the rotary magnetic head with respect to the recorded tracks on the magnetic tape changes. As described before, the sampled data which is to be entered is sampled during a gradual level change due to the inertia of the capstan motor. However, the comparison between the present sampled data and the previous sampled data can be performed accurately. The sampling interval can be lengthened according to the needs when the comparison cannot be made.

The CPU 52B performs the steps 124 through 126 described before, and stores a third sampled data $D_i$ (hereinafter also referred to as $D_2$) which is sampled at a time $t_{d2}$ in the step 127. The steps 128 through 130 are performed, and the digital signal having the quantization level "17" is obtained through the output port F at a time $t_{d3}$ in the step 122. Accordingly, as shown in FIG. 23(A), a control voltage V17 is supplied to the tracking adjuster 27 from the time $t_{d3}$ to a time $t_{d4}$ which is one frame after the time $t_{d3}$. Next, the CPU 52B performs the series of steps 123, 124, 126, 127, and 128, and the step 131 shown in FIG. 22B discriminates whether or not a fourth sampled data $D_i$ (hereinafter also referred to as $D_3$) is greater than or equal to the previous sampled data $D_{i-1}$ (third sampled data $D_2$). When it is assumed that the fourth sampled data $D_3$ is greater than the third sampled data $D_2$, the step 132 is performed. Since the previous output value is "15" and the present output value is "16", the discrimination result in the step 132 is NO, and the steps 133 and 134 are performed. The step 122 shown in FIG. 22A then obtains through the output port F the digital signal having the quantization level "16" at a time $t_{d4}$. Hence, from the time $t_{d4}$ to a time $t_{d5}$ which is one frame after the time $t_{d4}$, the control voltage V17 is continuously supplied to the tracking adjuster 27 as shown in FIG. 23(A).

Next, the CPU 52B similarly enters a fifth sampled data $D_4$ and the digital signal having the quantization level "18" is obtained through the output port F at a time $t_{d5}$ by performing the series of steps 123, 124, 126, 127, 128, and 131. The CPU 52B thereafter enters and stores a sixth sampled data $D_5$ and compares the sixth sampled data $D_5$ with the previous sampled data $D_4$ by performing the series of steps 123, 124, 126, 127, 128, and 131. In the case where the tracking control is carried out too much in one direction and the scanning position of the rotary magnetic head exceeds the optimum position, the present sampled data $D_4$ becomes smaller than the previous sampled data $D_3$. In this case, the discrimination result in the step 131 is NO, and a step 147 shown in FIG. 22B decrements the output value "17" which is stored in the memory by "1" and stores the decremented output value into the memory. Then, the digital signal having the quantization level "16" is obtained through the output port F at a time $t_{d6}$ in the step 122 shown in FIG. 22A. Hence, from the time $t_{d6}$ to a time $t_{d7}$ which is one frame after the time $t_{d6}$, the control voltage V16 is supplied to the tracking adjuster 27 as shown in FIG. 23(A).

Next, the CPU 52B enters a seventh sampled data $D_6$ sampled at the time $t_{d6}$ and stores the seventh sampled data $D_6$ as the sampled data $D_{i-1}$ by performing the series of steps 123, 124, 126, 127, and 128. The step 130 increments the output value "16" stored in the memory by "1", and the digital signal having the quantization level "17" is obtained through the output port F at a time $t_{d7}$ in the step 122. Accordingly, from the time $t_{d7}$ to a time $t_{d8}$ which is one frame after the time $t_{d7}$, the control voltage V17 is supplied to the tracking adjuster 27 as shown in FIG. 23(A). The CPU 52B then performs the series of steps 123, 124, 126, 127, 128, and 131 to enter and store an eighth sampled data $D_7$ sampled at the time $t_{d7}$ and also compare the eighth sampled data $D_7$ with the previous sampled data $D_6$. In the case where $D_6=D_7$, the present output value "16" is equal to the previous output value "16" and the discrimination result in the step 132 is YES. In this case, a step 135 discriminates whether or not the memory C is set. Since the memory C is in the reset state at this stage, the discrimination result in the step 135 is NO and a step 136 sets the memory C. After the step 136, the step 133 stores the present output value "16", and the step 137 increments the present output value by "1" and stores the incremented output value at another address in the predetermined memory. At a time $t_{d8}$, the step 122 shown in FIG. 22A obtains the digital signal having the quantization level "17" through the output port F.

Hence, after the power source is turned ON, each sampled data is entered and compared in the initial state of the tracking control (from the time $t_{d0}$ to the time $t_{d8}$) until the present output value coincides with the previous output value in the step 132. Hence, the tracking control is performed so that the approximate steady state is reached quickly. In the initial state, the capstan motor 19 shown in FIG. 3 is also in the initial state of the rotation, and it takes approximately several hundreds of milliseconds to reach the steady state, for example.

Next, the CPU 52B enters a ninth sampled data $D_8$ and detects that the memory c is set by performing the series of steps 123, 124, and 126. A step 137 successively stores the sampled data for a number of times the sampling is performed, and a step 138 discriminates whether or not a predetermined number of sampled data has been stored. For example, in the case where the predetermined number is equal to four, the CPU 52B successively stores the four sampled data $D_8$, $D_9$, $D_{10}$, and $D_{11}$ which are sampled at the times $t_{d8}$, $t_{d9}$, $t_{d10}$, and $t_{d11}$, and the discrimination result in the step 138 becomes YES. A step 139 calculates an average value $\overline{D}_8$ of the four sampled data $D_8$, $D_9$, $D_{10}$, and $D_{11}$, and the step 127 stores this average value $\overline{D}_8$ as the present sampled data $D_i$. In this case, the discrimination result in the step 128 is NO, and the step 129 stores the sampled data $D_i$ as the sampled data $D_{i-1}$. The step 130 increments the output value stored in the step 133 by "1", and the step 122 obtains through the output port F the digital signal having the quantization level "18" at a time $t_{d12}$. Accordingly, in the time period of four frames from the time $t_{d8}$ to a time $t_{d12}$, the control voltage V17 is supplied to the tracking adjuster 27 as shown in FIG. 23(B). Further, in the time period of four frames from the time $t_{d12}$ to a time $t_{D16}$, a control voltage V18 is supplied to the tracking adjuster 27. As described before, the step 130 does not store the incremented output value in the memory.

As described before, the sampled data and the output value obtained through the output port F after the initial state of the tracking operation ends are not accurate due to the inertia of the capstan motor and the level fluctuation component in the envelope detection signal. For this reason, the output value obtained through the output port F is not the optimum value. Accordingly, the present embodiment calculates the average value of the predetermined number (for example, four) of sampled data, and accurately obtains the optimum value by comparing the average value with the average value which is obtained previously.

In the time period of four frames from the time $t_{d12}$ to the time $t_{d16}$, the CPU 52B generates through the output port F a digital signal such that the control voltage V18 shown in FIG. 23(B) is supplied to the tracking adjuster 27. In addition, the CPU 52B calculates an average value $\overline{D}_{12}$ of four sampled data $D_{12}$, $D_{13}$, $D_{14}$, and $D_{15}$ which are obtained in this time period of four frames. The CPU 52B then discriminates whether or not the present average value $\overline{D}_{12}$ is greater than or equal to the previous average value $\overline{D}_8$. When the present average value $\overline{D}_{12}$ is greater than or equal to the previous average value $\overline{D}_8$, the CPU 52B discriminates whether or not the present output value is equal to the previous output value. In this case, the previous output value stored in the memory in the step 133 described before is "16", and the present output value stored at the other address of the memory at the time $t_{d8}$ is "17". Hence, the digital signal having the quantization level "18" is obtained through the output port F from the time $t_{d16}$. The above operations are performed in the series of steps 123, 124, 126, 137, 138, 139, 127, 128, 131, 132, 133, 134, and 122. The operation of comparing the present average value with the previous average value is repeated similarly thereafter until the discrimination result in the step 132 becomes YES. As a result, the control voltage supplied to the tracking adjuster 27 changes in terms of a time period of four frames as shown in FIG. 23(B).

When it is assumed that the present output value becomes equal to the previous output value in a time period of four frames from a time $t_{d36}$ to a time $t_{d40}$, the step 135 discriminates that the memory C is set, and a step 140 sets a timer so as to set a time period from the time $t_{d40}$ to a time $t_{dx}$.

Time periods between the time $t_{dx}$ and a time $t_{dx+32}$ shown in FIG. 23(c) are set similarly as in the case of the first setting in the steady state from the time $t_{d8}$ to the time $t_{d40}$. After the time $t_{dx+32}$, the timer is set again and the calibration is performed for every time period which is set repeatedly.

Next, description will be given with respect to another embodiment of the operation of the CPU 52B in the sixth embodiment, by referring to FIGS. 24A and 24B. In FIGS. 24A and 24B, those parts which are the same as those corresponding parts in FIGS. 22A and 22B are designated by the same reference numerals, and description thereof will be omitted. When the step 124 detects that the mode discrimination signal indicating the special reproduction mode is applied to the input terminal 112, a step 141 resets two predetermined internal memories C and D of the CPU 52B. The operation is then returned to the step 123 after the step 141. On the other hand, in the normal reproduction mode after the present sampled data $D_i$ is stored in the step 127, a step 142 discriminates whether or not the memory D is set. In the initial state, the memory D is in the reset state and the discrimination result in the step 142 is NO, and the operation advances to the step 128.

Figure 22B:
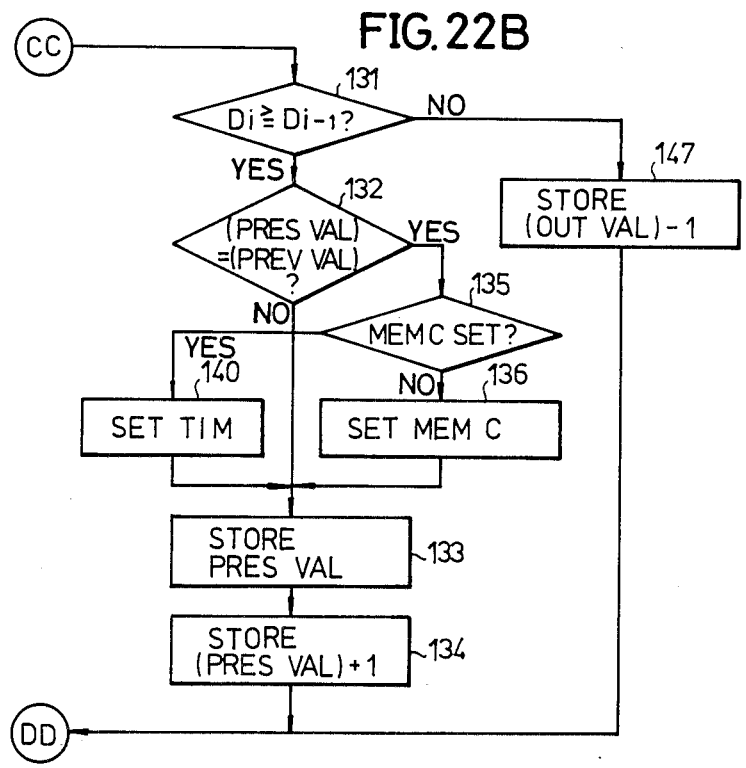
FIGS. 22A and 22B respectively are flow charts for explaining an embodiment of the operation of a CPU in the block system shown in FIG. 21.
Figure 22A:
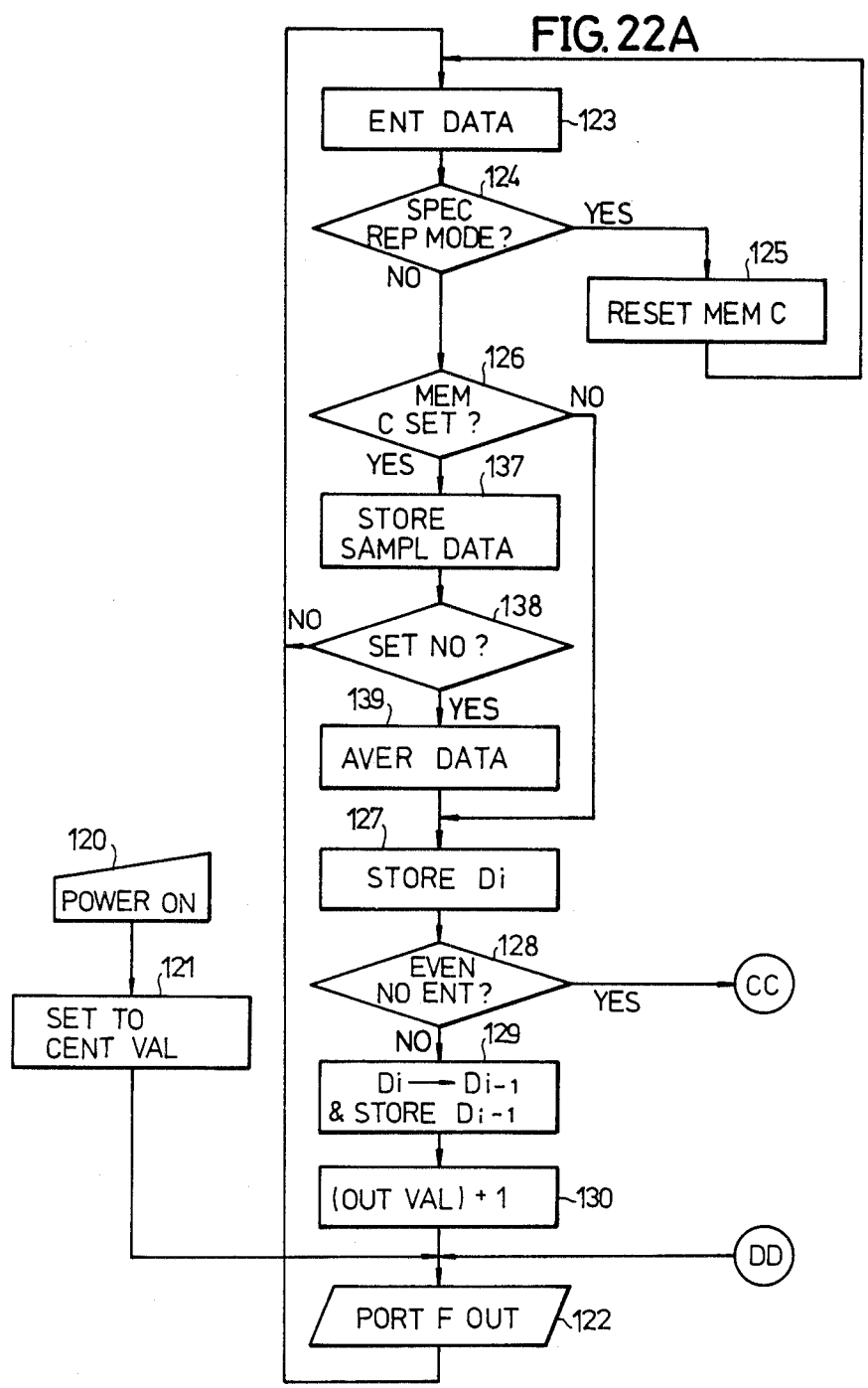

As in the case of the embodiment of the operation of the CPU 52B described in conjunction with FIGS. 22A and 22B, the CPU 52B controls the tracking adjuster 27 based on the comparison between the present sampled data $D_i$ and the previous sampled data $D_{i-1}$ in the initial state of the tracking control. However, after the steady state of the tracking control is reached, the present embodiment of the operation of the CPU 52B is different from the embodiment of the operation described before. In other words, when the first setting in the steady state is ended, the step 135 detects the set state of the memory C, a step 143 sets the memory D, and a step 144 stores an average value $D_{i-1}$.

Next, the CPU 52B performs the series of steps 123, 124, 126, 137, 138, 139, 127, and 142. As a result, a plurality of sampled data are entered in the CPU 52B and average values of the plurality of sampled data are stored. In addition, the set state of the memory D is discriminated. A step 145 discriminates whether or not the present average value $D_i$ is equal to the previous sampled value $D_{i-1}$. When the discrimination result in the step 145 is YES, the operation advances to the step 123 to enter the data of the envelope detection signal. On the other hand, when the present average value $D_i$ changes and the two average values $D_i$ and $D_{i-1}$ become different, the operation advances to a step 146 which resets the memory D. After the step 146, the operation advances to the step 128. Accordingly, the calibration to obtain the optimum value for the tracking control is performed. Similarly, the tracking control based on the present and previous average values is performed until the memory D is set in the step 143.

Therefore, in the steady state of the tracking control, the time interval of the calibration is fixed by the timer in the embodiment of the operation of the CPU 52B described before, but the calibration is only performed when the present and previous average values differ according to the present embodiment of the operation of the CPU 52B.

In the embodiments described heretofore, a CPU M50760-XXXP manufactured by Mitsubishi Electric Corporation of Japan can be used for the CPUs 36, 52, 52A, and 52B.

In addition, according to the embodiments described heretofore, in the case where the track width is 19 μm, for example, it is possible to converge the tracking error within approximately 1.5 μm by use of a 4-bit CPU and within approximately 0.75 μm by use of a 5-bit CPU.

Further, the present invention is not limited to these embodiments, but various variations and modifications may be made without departing from the scope of the present invention.

What is claimed is:

1. A tracking control system comprising:
   a capstan motor for moving a magnetic tape which is at least recorded with a frequency modulated signal and a control signal having a constant period;
   a driving circuit for generating a signal which drives said capstan motor;
   a control head for reproducing the control signal from the magnetic tape in a reproducing mode;
   head means for reproducing the frequency modulated signal from the magnetic tape in the reproducing mode;
   a tracking adjuster for generating a comparison signal;
   a phase comparator for comparing phases of the reproduced control signal with the comparison signal and for generating a phase error signal, said phase error signal being supplied to said driving circuit to control said driving circuit;
   sampling means for sampling a signal which is based on the reproduced frequency modulated signal with a preset sampling interval;
   discriminating means for discriminating levels of sampled data obtained from said sampling means; and
   control signal generating means for generating a control signal based on a discriminated result in said discriminating means and for supplying the control signal to said tracking adjuster, said control signal automatically and variably controlling a duty cycle of the output comparison signal of said tracking adjuster so that an envelope level of the reproduced frequency modulated signal becomes a maximum.

2. A tracking control system as claimed in claim 1 in which said sampling means samples an envelope detection signal of the reproduced frequency modulated signal with the preset sampling interval.

3. A tracking control system as claimed in claim 1 in which said discriminating means successively discriminates a greater one of a present sampled data obtained from said sampling means and a previous sampled data obtained from said sampling means immediately before the present sampled data.

4. A tracking control system as claimed in claim 1 in which said discriminating means obtains average values of a predetermined number of sampled data from said sampling means and successively discriminates a greater one of a present average value and a previous average value obtained immediately before the present average value.

5. A tracking control system as claimed in claim 1 which further comprises rotational phase detecting means for detecting a rotational phase of said head means and for generating a rotation detection pulse signal, said rotation detection pulse signal being supplied to said tracking adjuster, said tracking adjuster generating the comparison signal by variably controlling a duty cycle of said rotation detection pulse signal responsive to said control signal.

6. A tracking control system as claimed in claim 5 in which said tracking adjuster comprises a monostable multivibrator supplied with said rotation detection pulse signal for generating said comparison signal, a variable resistor having one end thereof coupled to a fixed power source voltage, and a capacitor having one end thereof coupled to the other end of said variable resistor and having the other end thereof grounded, said monostable multivibrator being supplied with a voltage at a connection point of said variable resistor and said capacitor, said control signal being supplied to said variable resistor and varying a resistance of said variable resistor so as to vary a time constant of said monostable multivibrator.

7. A tracking control system as claimed in claim 5 in which said tracking adjuster comprises a monostable multivibrator supplied with said rotation detection pulse signal for generating said comparison signal, a resistor applied with said control signal to one end thereof, and a capacitor having one end thereof coupled to the other end of said resistor and having the other end thereof grounded, said monostable multivibrator being supplied with a voltage at a connection point of said resistor and said capacitor.

8. A tracking control system as claimed in claim 1 in which said sampling means, said discriminating means, and said control signal generating means constitute a signal processing part, said signal processing part comprising a central processing unit supplied with said rotation detection pulse signal for generating a sampling pulse signal having a predetermined period and a predetermined pulse width based on said rotation detection pulse signal, a sample and hold circuit for sampling and holding an envelope detection signal of the reproduced frequency modulated signal responsive to said sampling pulse signal, and analog-to-digital converter for generating a digital sampled data by subjecting an output sampled data of said sample and hold circuit to an analog-to-digital conversion, said central processing unit discriminating a greater of two successive digital sampled data from said analog-to-digital converter and generating a digital control signal based on a discriminated result, and a digital-to-analog converter generating said control signal by subjecting said digital control signal to a digital-to-analog conversion and for supplying said control signal to said tracking adjuster.

9. A tracking control system as claimed in claim 8 in which said central processing unit generates a sampling pulse signal having a period of one frame of a video signal.

10. A tracking control system as claimed in claim 8 in which said central processing unit is further supplied with a mode discrimination signal indicating that the reproducing mode is a normal reproduction mode or a special reproduction mode, said central processing unit generating a digital control signal for setting the duty cycle of the output comparison signal of said tracking adjuster to an approximate center value in a variable range of the duty cycle when said mode discrimination signal indicates the special reproduction mode.

11. A tracking control system as claimed in claim 1 in which said sampling means, said discriminating means, and said control signal generating means constitute a signal processing part, said signal processing part comprising a central processing unit for generating a digital comparison signal, a first digital-to-analog converter for generating a staircase having a level which successively increases in steps from zero with a predetermined period by subjecting said digital comparison signal to a digital-to-analog conversion, a comparator for comparing a level of an envelope detection signal of the reproduced frequency modulated signal with a level of the output staircase of said first digital-to-analog converter and for supplying a first signal to said central processing unit when the level of said staircase becomes greater than that of said envelope detection signal, said central processing unit entering the level of said staircase as a sampled data responsive to said first signal and successively discriminating a greater one of two successive sampled data which are entered to generate a digital control signal based on a discriminated result, and a second digital-to-analog converter for obtaining said control signal by subjecting said digital control signal to a digital-to-analog conversion and supplying said control signal to said tracking adjuster.

12. A tracking control system as claimed in claim 11 in which said central processing unit generates a digital control signal for setting the duty cycle of the output comparison signal of said tracking adjuster to an approximate center value in a variable range of the duty cycle in an initial state for a time when the magnetic tape starts to move until a time when the tape movement stabilizes.

13. A tracking control system as claimed in claim 1 in which said sampling means, said discriminating means, and said control signal generating means constitute a signal processing part, said signal processing part comprising a central processing unit for generating a digital comparison signal, a first digital-to-analog converter for generating a staircase having a level which successively increases in steps from zero with a predetermined period by subjecting said digital comparison signal to a digital-to-analog conversion, a sample and hold circuit for sampling an envelope detection signal of the reproduced frequency modulated signal with a preset sampling interval and for holding a sampled data until a next sampling time, a comparator for comparing a level of an output sampled and held data of said sample and hold circuit with a level of the output staircase of said first digital-to-analog converter and for supplying a first signal to said central processing unit when the level of said staircase becomes greater than that of said sampled and held data, said central processing unit entering the level of said staircase as a sampled data responsive to said first signal and successively discriminating a greater one of two successive sampled data which are entered to generate a digital control signal based on a discriminated result, and a second digital-to-analog converter for obtaining said control signal by subjecting said digital control signal to a digital-to-analog conversion and supplying said control signal to said tracking adjuster.

14. A tracking control system as claimed in claim 13 in which said signal processing part further comprises a circuit for generating a sampling control pulse signal for said sample and hold circuit based on said rotation detection pulse signal.

15. A tracking control system as claimed in claim 13 in which said central processing unit further generates a sampling control pulse signal for said sample and hold circuit based on said rotation detection pulse signal.

16. A tracking control system as claimed in claim 13 in which said central processing unit generates a digital comparison signal for causing said first digital-to-analog converter to generate a staircase having a level which successively increases in a maximum of $2^{n+i}$ steps within one sampling interval, where n is an integer greater than one and i is a positive integer smaller than n, said central processing unit entering as a sampled data an n-bit value corresponding to a digitized level of the staircase responsive to said first signal and storing in an internal memory thereof an i-bit value as predetermined upper bits of said n-bit value when the number of steps is greater than $2^n$ when said first signal is received, said central processing unit discriminating a greater one of a present n-bit sampled data and a previous n-bit sampled data entered immediately before the present n-bit sampled data and a greater one of a present i-bit value and a previous i-bit value stored immediately before the present i-bit value and generating a (n+i)-bit digital control signal based on discriminated results.

17. A tracking control system as claimed in claim 16 in which said central processing unit is a 4-bit central processing unit.

18. A tracking control system as claimed in claim 13 in which said central processing unit discriminates a greater one of a present sampled data and a previous sampled data entered immediately before the present sampled data in an initial state of a tracking control operation and discriminates a greater one of a first average value of a predetermined number of sampled data and a second average value of the predetermined number of sampled data entered immediately before the first average value in an approximate steady state of the tracking control operation, and generates a digital control signal based on a discriminated result.

19. A tracking control system as claimed in claim 18 in which said central processing unit generates a detection signal when a change in said first and second average values is detected in the approximate steady state of the tracking control operation and newly generates a digital signal which is used to successively and variably control a pulse width of the output comparison signal of said tracking adjuster based on said detection signal, so that a tracking control operation is performed again to obtain a maximum of the envelope detection signal of the reproduced frequency modulated signal only when the change in said first and second average values is detected.

* * * * *